United States Patent
Waizumi et al.

(10) Patent No.: US 8,001,583 B2
(45) Date of Patent: Aug. 16, 2011

(54) NETWORK FAILURE DETECTION METHOD AND NETWORK FAILURE DETECTION SYSTEM

(75) Inventors: Yuji Waizumi, Miyagi (JP); Hiroshi Tsunoda, Miyagi (JP); Yoshiaki Nemoto, Miyagi (JP)

(73) Assignee: Tohoku University, Miyagi (JP)

( * ) Notice: Subject to any disclaimer, the term of this patent is extended or adjusted under 35 U.S.C. 154(b) by 552 days.

(21) Appl. No.: 12/092,997

(22) PCT Filed: Nov. 8, 2006

(86) PCT No.: PCT/JP2006/322236
§ 371 (c)(1),
(2), (4) Date: May 8, 2008

(87) PCT Pub. No.: WO2007/055222
PCT Pub. Date: May 18, 2007

(65) Prior Publication Data
US 2009/0265784 A1    Oct. 22, 2009

(30) Foreign Application Priority Data

Nov. 8, 2005  (JP) ................................. 2005-323007
May 9, 2006   (JP) ................................. 2006-130680

(51) Int. Cl.
*G06F 7/04*    (2006.01)

(52) U.S. Cl. ......................................................... 726/3
(58) Field of Classification Search .................. None
See application file for complete search history.

(56) References Cited

U.S. PATENT DOCUMENTS

2006/0182039 A1*  8/2006  Jourdain et al. .............. 370/252
* cited by examiner

*Primary Examiner* — Brandon S Hoffman
(74) *Attorney, Agent, or Firm* — Young & Thompson

(57) ABSTRACT

A system provides definitions of network states, and identifies a cause for the anomaly upon detection. A traffic measuring portion (characteristic quantity generating portion) counts the number of packets/time slot classified by traffic type with respect to network traffic, generating a characteristic quantity; a memory portion stores information about the characteristic quantity; a portion calculates correlation coefficients between each pair of characteristic quantities classified by traffic type; a portion generates a histogram from correlation coefficients; a portion for determining the severity of an anomaly based on the histogram; a portion evaluates the similarity of an anomaly of interest to a reference anomaly using the occurrence probabilities of correlation coefficients; and a portion assigns a color to each pixel according to its occurrence probability value, generating an n×n picture. Visualization of network state is achieved using probability distribution vectors derived from correlation coefficients obtained from each characteristic quantities pair.

20 Claims, 15 Drawing Sheets about 50 clients

FIG. 9
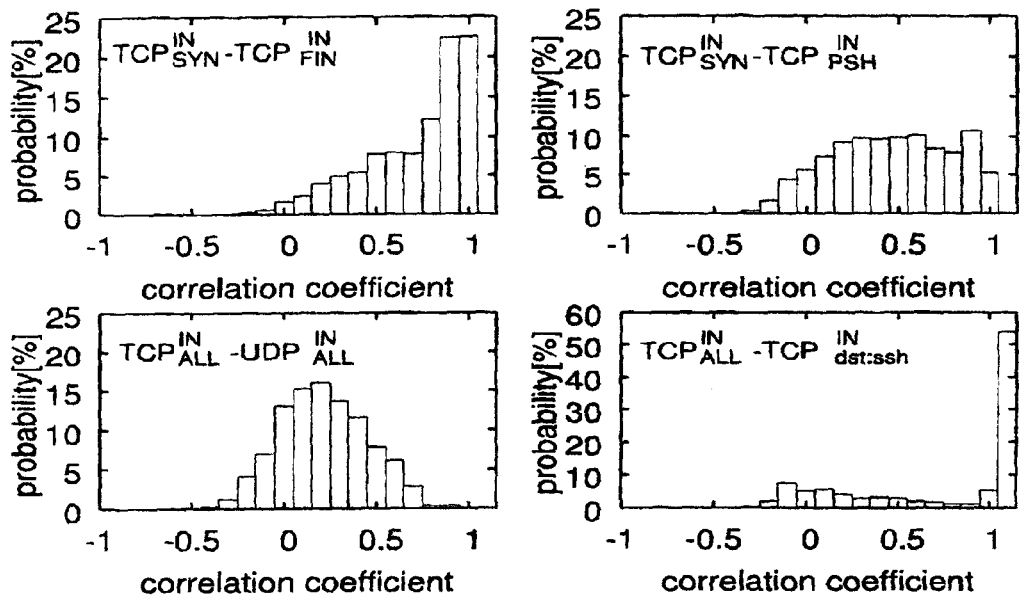
FIG. 10 Probability distriution or correlqtion coefficients betweem twp characteristic quantities cpmbined.
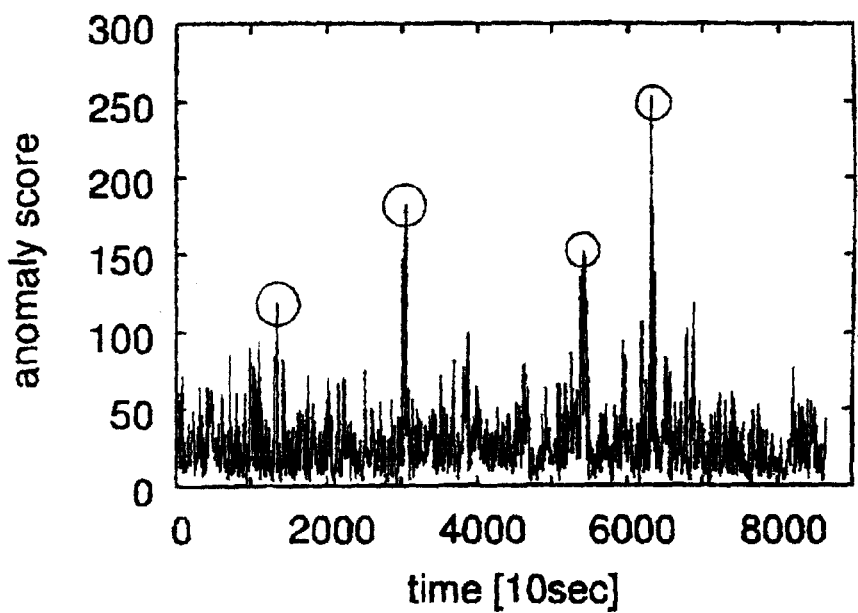
Exemplary anomalous scores observed during the experimental period Histogram of correlation coefficients between TCP IN/SYN and TCP IN/dst:144-1023

Histogram of correlation coefficients between TCP IN/SYN and TCP IN/dst:SSH

Histogram of correlation coefficients between TCP IN/dst:SMTP and TCP OUT/dst:SMTP

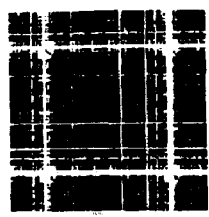
FIG. 17
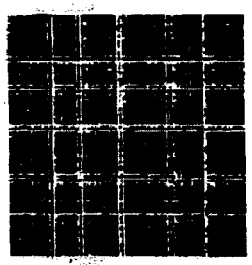
FIG. 18
FIG. 19
```
00:53:51.298753 IP srcIP     > dstIP:
              icmp 40: echo request seq 1
00:53:51.298074 IP srcIP.80 > dstIP.53:
              . ack 0 win 1400
00:53:51.299623 IP srcIP.53 > dstIP.53:
              S 4264025687:4264028687(0) win 1400
00:53:51.300458 IP srcIP.55 > dstIP.49153:
              UDP, length: 10
00:53:51.597704 IP srcIP.53 > dstIP.53:
              R 4264025688:4264028688(0) win 1400
00:53:51.598453 IP srcIP.53 > dstIP.53:
              R 4264028688:4264028688(0) win 0
```
FIG. 20
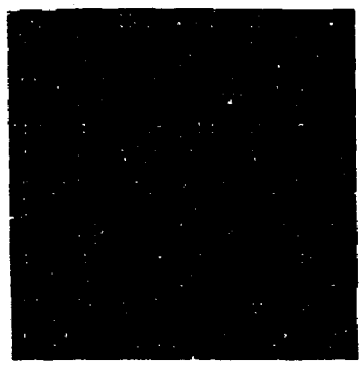 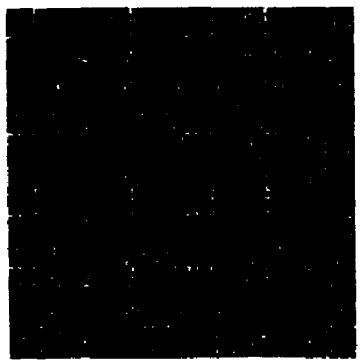
FIG. 21

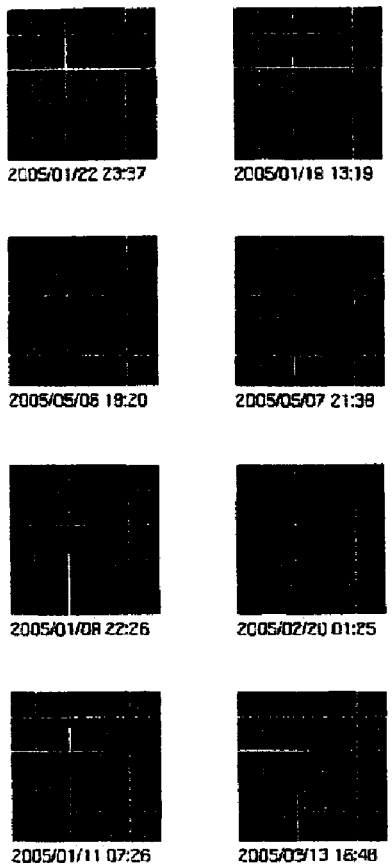

NETWORK FAILURE DETECTION METHOD AND NETWORK FAILURE DETECTION SYSTEM

TECHNICAL FIELD

The present invention relates to a technique for detecting an unauthorized access to a network, which interferes with the security of the network.

BACKGROUND ART

In the current internet communication, techniques used by attackers for intrusion and denial of services (DoS) become very exquisite, and new types of worms and viruses appear one after another incessantly, and those rogue programs abuse the available band to put the network communication into disorder or elicit the leakage of information, to pose a big problem in the security of the internet.

In view of this situation, attention has been directed recently to an anomaly-sensitive intrusion detection system (IDS), a system that is tuned for specifically detecting a new type of attack to a network. According to the rationale of this anomaly-sensitive IDS, the normal operation state of a network is defined in advance, and the IDS checks the current state of the network, compares the current state with the normal state, evaluates how much the current state is diverged from the normal state, and determines whether there is an intrusion in the network based on the evaluation result. As compared with the offence-sensitive IDS represented by Snort (M. Roesch, "Snort-Lightweight Intrusion Detection for Networks," Proc. Usenix LISA '99 Conf., November 1999), the anomaly-sensitive IDS is advantageous in that it can detect a new type of attack because it does not require any rules or signatures for the detection of an intrusion. Moreover, in addition to the detection of an unauthorized access to a network, the anomaly-sensitive IDS allows detection of the anomalies of a network such as failure of the hardware components of the network or the shut-down of a server in the network, and thus the intrusion detection technique based on the anomaly detection becomes an important element in the management of a network.

According to the anomaly-sensitive intrusion detection, it is necessary to properly define the normal operation state of a network, and for this purpose to introduce an operation state assessment parameter, which allows one to make the quantitative evaluation of the operation state of a network. Y. Uchiyama et al. offer a method specifically directed to the detection of DoS attacks (Y. Uchiyama et al., "Detecting and Tracing DDoS Attacks in the Traffic Analysis Using Auto Regressive Model," IEICE Transactions on Traffic Measurement and Analysis, Vol. E87-D, No. 12, p. 2635, December 2004). According to the method, the number of packets for a certain unit of time expected from the past operation is introduced as a feature value, and the normal operation state is defined in terms of the feature value. However, when the normal operation state of a network is defined in terms of the number of packets passed for a certain unit of time, that is, in terms of an absolute value of a single parameter such as the feature value, the method will not be able to promptly respond to the abrupt change in traffic flow of the network during its normal operation. To cope with this problem, N. Nakai, et al., determine the numbers of packets observed for different types of traffics, take them as feature values, calculate the ratios of the feature values between different types of traffic, and use the ratios for the definition of the normal state of a network (N, Nakai et al., "Detection of the Intrusion of a Network Based on the Change of Internal Condition of Traffic," Research Report of the Japanese Society for Electronic Information Technology, NS2005-5, April, 2005). An alternative method is offered by T. Oikawa, et al. (T. Oikawa, et al., "Detection of the Intrusion of a Network by Means of Statistical Clustering," Research Report of the Japanese Society for Electronic Information Technology, NS2002-143, October, 2002). In the same manner as above, this method also determines the packet numbers for different types of traffics, calculates correlation coefficients between different types of traffics using main component analysis, and defines the normal operation condition of a network using a main component coordinate obtained as a result of the calculation. Since the various types of traffics flowing through a network are controlled according to a number of protocols, it is possible for the flow of a given type of traffic and its change to retain a certain relationship to each other at a normal operation condition, and thus the definition of the normal operation condition based on such a correlation will be effective in the detection of an anomaly if any of the network.

However, according to the method offered by T. Oikawa, evaluation of the operation condition of a network is achieved by referring to the single main component coordinate, which has been obtained through the plotting of the correlation coefficients between different feature values, and thus it is difficult to identify the cause responsible for the anomaly. In view of this, Japanese Patent Application No. 2005-323007 titled "Method and System for Detecting an Anomaly of a Network," provides a method for identifying, if there is an anomaly, the cause responsible for its occurrence, the method comprising evaluating the operation condition of a network based on plural correlation coefficients calculated for each pair of feature values. In order to reduce the loss of information with regard to the normal operation condition of a network, this method defines the normal operation condition based on a histogram representing the occurrence probabilities of correlation coefficients, instead of the average or variance of correlation coefficients, and evaluates the severity of an anomaly by determining correlation coefficients between different feature values, and comparing a histogram derived therefrom with the occurrence probability profile of the corresponding normal histogram.

DISCLOSURE OF THE INVENTION

Since the method disclosed in the Japanese Patent Application No. 2005-323007 evaluates the severity of an anomaly by determining correlation coefficients between different feature values, and comparing a histogram derived therefrom with the occurrence probability profile of the corresponding normal histogram, the method will not be able to grasp the overall state of traffics at large, even though it can detect individual anomalies, and thus the method can hardly offer any definite clue sufficiently promptly as to what has happened over the network at a time when the anomaly happens.

In order to solve the problem described above, the present invention takes the occurrence probabilities of correlation coefficients, expresses them as a matrix of the pairs of two observation quantities used for the calculation of those correlation coefficients, assigns a color to each of the occurrence probabilities according to its value, and visualizes the matrix as a picture. This method allows the relationships between the plural observation quantities representing the overall traffic of a network to be visualized as a picture, and enables the observer to intuitively grasp the state of overall traffics at the time when the observation is made. If pictures obtained during the occurrence of each anomaly or intrusion are stored and accumulated into a database, it will be possible not only to identify, if there occurs an anomaly, the cause of the anomaly but also to readily grasp the contemporary state of the network at large, by taking a picture when the anomaly occurs, and searching a comparable picture through the database. This will help to improve the efficiency of network management.

To attain the above object, an anomaly detecting method the present invention comprises a feature value generating step for counting the number of packets per each time slot for each traffic type with respect to the traffic of a network and generating it as a feature value; a correlation coefficient calculating step for taking the feature value of each traffic type generated via the feature value generating step, and calculating correlation coefficients between each pair of two feature values; a histogram generating step for generating a histogram from the correlation coefficients for each pair of two feature values; and an anomaly severity determining step for determining the severity of an anomaly of interest using the histograms generated via the histogram generating step, the method further comprising a state similarity evaluating step for evaluating the similarity of the anomaly of interest to a reference anomaly using the occurrence probabilities of correlation coefficients used for the construction of a histogram; and a visualizing step for expressing the occurrence probabilities of correlation coefficients calculated via the state similarity evaluating step as a matrix and assigning colors to the occurrence probabilities of the matrix for the visualization of the matrix.

The feature value generating step of the invention classifies packets to k types according to the protocols and flags governing them, takes them as k types of traffics, counts the number of packets for each type of traffic, and takes the result as a feature value of that type of traffic where k represents a natural number equal to or larger than 2.

The correlation coefficient calculating step of the invention comprises a step for calculating correlation coefficients for each pair of two feature values out of the k feature values generated via the feature value generating step, where calculation of correlation coefficients between two feature values occurs by taking a time slot having a width W as a window, shifting the window for each interval equal to S time slots, calculating a correlation coefficient for each shift, and repeating the same procedure to obtain a sequence of correlation coefficients, and collecting, using the above step, sequences of correlation coefficients for all the pairs of two feature values chosen from the k feature values where W represents a natural number equal to or larger than 2 and S a natural number.

The correlation coefficient calculating step as of the invention takes, if there is a combination of two feature values for which calculation of the correlation coefficients is impossible, defines the combination as an exempt combination. The combination, which rejects the calculation of correlation coefficients, may include a case where a group of involved packets to be captured within the window cannot be observed in any way for some reason, or a case where a group of involved packets within the window remain constant. However, the incidence of such a case is important for the evaluation of the state of a network, and thus an exempt value (a value out of the range of −1 to +1) may be introduced for defining the correlation coefficient of such an abortive combination. The exempt value will be necessary when the histogram generating step generates a histogram of correlation coefficients for an abortive combination.

The histogram generating step of the invention takes the sequences of correlation coefficients obtained for all the pairs of two feature values chosen from the k feature values generated via the correlation coefficient calculating step, and generates histograms representing the occurrence probabilities of individual correlation coefficients divided by a specified class. Utilizing the fact that correlation coefficients distribute in the range of −1 to +1, the step introduces, within the range, classes having a width of a certain value (e.g., 0.1), and generates a histogram representing the occurrence probabilities of correlation coefficients classified by classes for each pair of two feature values out of the k feature values. If there is any exempt correlation coefficient whose value is out of the above range of −1 to +1, the step introduces an abortive class to include any correlation coefficients obtained from such abortive combinations, and generates a histogram including the occurrence probabilities of such exempt correlation coefficients.

The anomaly severity determining step of the invention takes each of the histograms generated via the histogram generating step, defines it as a model representing the normal operation state of a network, and determines the severity of an anomaly of interest by comparing a histogram of the correlation coefficients between a pair of two feature values calculated during the occurrence of the anomaly via the correlation coefficient calculation step, with the occurrence probability profile of the corresponding histogram representing the normal operation state of a network.

The anomaly severity determining step of the invention further comprises a step for taking the correlation coefficients between each pair of feature values calculated via the correlation coefficient calculation step above, expressing them as a matrix, and converting the matrix constituted of correlation coefficients into a matrix constituted of the occurrence probabilities of correlation coefficients, using a model histogram defined in advance for each pair of two feature values which represents the normal operation state of a network, and a step for quantitatively determining the severity of an anomaly of interest by counting, for the matrix constituted of the occurrence probabilities of correlation coefficients, the total number of elements whose values are equal to or less than a threshold, or counting, for the matrix constituted of the occurrence probabilities of correlation coefficients, the total number of elements for each column or for each row whose occurrence probabilities are equal to or less than a threshold.

The state similarity evaluating step of the invention comprises taking the correlation coefficients between each pair of two feature values calculated via the correlation coefficient calculation step above, expressing them as a matrix, converting the matrix constituted of correlation coefficients into a corresponding probability distribution vector, by means of a model histogram defined in advance for each pair of two feature values which represents the normal operation state of a network, gathering plural probability distribution vectors representing a similar anomaly, unifying them into a single profile by calculating the average of them or clustering them, evaluating the similarity of the probability distribution vector of an incident of interest to that profile, and estimating the cause of the incident based on the evaluation result.

The similarity evaluating step of the invention comprises calculating an Euclidean distance between the probability distribution vector used for the definition of the profile above, and the probability distribution vector of an incident of interest, and using the Euclidean distance thus obtained as an indicator representing the similarity of the incident to the anomaly referred to.

The state similarity evaluating step of the invention comprises a step for taking the correlation coefficients between each pair of two feature values calculated via the correlation coefficient calculation step, expressing them as a matrix, converting the matrix constituted of correlation coefficients into a matrix constituted of the occurrence probabilities of correlation coefficients by means of a model histogram defined in advance for each pair of two feature values which represents the normal operation state of a network, and a step for counting, when comparing matrices A and B both constituted of the occurrence probabilities of correlation coefficients, the number of elements whose values are equal to or less than a threshold for both the matrices, and quantitatively determining the similarity of matrices A and B based on the calculation result.

The visualization step of the invention visualizes the change of the operation state of a network by taking each combination of two feature values as representative of a pixel, deriving the pixel value from the probability distribution vector (n×n dimensional vector) calculated from the correlation coefficients via the state similarity evaluation step above, assigning a color to each of the occurrence probabilities constituting the matrix, and obtaining thereby a picture having an n×n dimensional expanse, and visualizing the change of the operation state of a network over time by tracking the change of colors displayed in the picture where n represents a natural number equal to or larger than 2.

A system of the invention for detecting an anomaly in a network comprises a feature value generating portion for counting the number of packets per each time slot for each traffic type with respect to the traffic of a network and generating it as a feature value; a correlation coefficient calculating portion for taking the feature value of each traffic type generated by the feature value generating portion, and calculating correlation coefficients between each pair of two feature values; a histogram generating portion for generating a histogram from the correlation coefficients generated by the correlation coefficient calculating portion for each pair of two feature values; and an anomaly severity determining portion for determining the severity of an anomaly of interest using the histograms generated by the histogram generating portion, the system further comprising a state similarity evaluating portion for evaluating the similarity of the anomaly of interest to a reference anomaly using the occurrence probabilities of correlation coefficients used for the construction of a histogram; and a visualization portion for expressing the occurrence probabilities of correlation coefficients calculated by the state similarity evaluating portion as a matrix and assigning a color to each element of the matrix according to the occurrence probability value thereof, thereby converting the matrix into a picture.

The feature value generating portion of the invention classifies packets to k types according to the protocols and flags governing them, takes them as k types of traffics, counts the number of packets for each type of traffic, and takes the result as a feature value of that type of traffic where k represents a natural number equal to or larger than 2.

The correlation coefficient calculating portion of the invention further comprises means for calculating correlation coefficients for each pair of two feature values out of the k feature values generated by the feature value generating portion, where calculation of correlation coefficients between two feature values occurs by taking a time slot having a width W as a window, shifting the window for each interval equal to S time slots, calculating a correlation coefficient for each shift, and repeating the same procedure to obtain a sequence of correlation coefficients, and collecting, using the above means, sequences of correlation coefficients for all the pairs of two feature values chosen from the k feature values where W represents a natural number equal to or larger than 2 and S a natural number.

The correlation coefficient calculating portion of the invention defines, if there is a combination of two feature values for which calculation of the correlation coefficients is impossible, the combination as an exempt combination, and assigns an exempt value as the correlation coefficient for the combination. The combination, which rejects the calculation of correlation coefficients, may include a case where a group of involved packets to be captured within the window cannot be observed in any way for some reason, or a case where a group of involved packets within the window remain constant. However, the incidence of such a case is important for the evaluation of the state of a network, and thus an exempt value (a value out of the range of −1 to +1) may be introduced for defining the correlation coefficient of such an abortive combination. The exempt value will be necessary when the histogram generating portion generates a histogram of correlation coefficients for an abortive combination.

The histogram generating portion of the invention takes the sequences of correlation coefficients obtained for all the pairs of two feature values chosen from the k feature values generated by the correlation coefficient calculating portion, and generates histograms representing the occurrence probabilities of individual correlation coefficients divided by a specified class. Utilizing the fact that correlation coefficients distribute in the range of −1 to +1, the portion introduces, within the range, classes having a width of a certain value (e.g., 0.1), and generates a histogram representing the occurrence probabilities of correlation coefficients classified by classes for each pair of two feature values out of the k feature values. If there is any exempt correlation coefficient whose value is out of the above range of −1 to +1, the portion introduces an abortive class to include any correlation coefficients obtained from such abortive combinations, and generates a histogram including the occurrence probabilities of such exempt correlation coefficients.

The anomaly severity determining portion of the invention takes each of the histograms generated by the histogram generating portion, defines it as a model representing the normal operation state of a network, and determines the severity of an anomaly of interest by comparing a histogram of the correlation coefficients between a pair of two feature values calculated during the occurrence of the anomaly by the correlation coefficient calculation portion, with the occurrence probability profile of the corresponding histogram representing the normal operation state of a network.

The anomaly severity determining portion of the invention comprises means for taking the correlation coefficients between each pair of feature values calculated by the correlation coefficient calculation portion, expressing them as a matrix, and converting the matrix constituted of correlation coefficients into a matrix constituted of the occurrence probabilities of correlation coefficients, using a model histogram defined in advance for each pair of two feature values which represents the normal operation state of a network, and means for quantitatively determining the severity of an anomaly of interest by counting, for the matrix constituted of the occurrence probabilities of correlation coefficients, the total number of elements whose values are equal to or less than a threshold, or counting, for the matrix constituted of the occurrence probabilities of correlation coefficients, the total number of elements for each column or for each row whose occurrence probabilities are equal to or less than a threshold.

The state similarity evaluating portion of the invention takes the correlation coefficients between each pair of two feature values calculated by the correlation coefficient calculation portion, expresses them as a matrix, converts the matrix constituted of correlation coefficients into a corresponding probability distribution vector, by means of a model histogram defined in advance for each pair of two feature values which represents the normal operation state of a network, gathers plural probability distribution vectors representing a similar anomaly, unifies them into a single profile by calculating the average of them or clustering them, evaluates the similarity of the probability distribution vector of an incident of interest to that profile, and estimates the cause of the incident based on the evaluation result.

The similarity evaluating portion of the invention calculates an Euclidean distance between the probability distribution vector used for the definition of the profile, and the probability distribution vector of an incident of interest, and uses the Euclidean distance thus obtained as an indicator representing the similarity of the incident to the anomaly referred to.

The state similarity evaluating portion of the invention comprises means for taking the correlation coefficients between each pair of two feature values calculated by the correlation coefficient calculation portion, expressing them as a matrix, converting the matrix constituted of correlation coefficients into a matrix constituted of the occurrence probabilities of correlation coefficients by means of a model histogram defined in advance for each pair of two feature values which represents the normal operation state of a network, and means for counting, when comparing matrices A and B both constituted of the occurrence probabilities of correlation coefficients, the number of elements whose values are equal to or less than a threshold for both the matrices, and quantitatively determining the similarity of matrices A and B based on the calculation result.

The visualization portion of the invention visualizes the change of the operation state of a network by taking each combination of two feature values as representative of a pixel, deriving the pixel value from the probability distribution vector (n×n dimensional vector) calculated from the correlation coefficients by the state similarity evaluating portion, assigning a color to each of the occurrence probabilities constituting the matrix, and obtaining thereby a picture having an n×n dimensional expanse, and visualizing the change of the operation state of a network over time by tracking the change of colors displayed in the picture.

According to ab aspect of the invention, plural correlation coefficients are calculated for each pair of two feature values and the occurrence probabilities of individual correlation coefficients are expressed as a histogram, which allows one to define the normal operation state of a network that will enable the identification of the cause of an anomaly, once the anomaly is detected. Moreover, since one can easily grasp the overall state of a network at a glance, it will be possible to take a proper measure promptly whenever an anomaly occurs. Each time an anomaly or intrusion occurs, pictures representing the anomaly or intrusion are generated and these pictures can be stored and accumulated into a database. Thus, it will be possible, if there occurs an anomaly, to readily grasp the contemporary state of a network at large by taking a cursory look at relevant pictures. This will help to increase the efficiency of network management.

According to an aspects of the invention, the number of packets per each time slot counted for each traffic type with respect to the traffic of a network is taken as a feature value, and correlation coefficients between two feature values from a pair of two traffic types are calculated, and thus it is possible to quantitatively define the operation state of a network based on the correlation coefficients. Since the various types of traffics flowing through a network are controlled according to a number of protocols, it is possible for the flow of a given type of traffic and its change to retain a certain relationship to each other at a normal operation condition, and thus the definition of the normal operation condition based on such a correlation will be effective in the detection of an anomaly if any of the network.

According to an aspect of the invention, if there is a combination of two feature values for which calculation of the correlation coefficients is impossible, the combination is taken as an exempt combination, and an exempt value is introduced for defining the correlation coefficient of such an exempt combination. Thus, even for a case where a group of involved packets to be captured within the window can not be observed in any way for some reason, or a group of involved packets within the window remain constant, it will be possible to provide a histogram of correlation coefficients including those from such an abortive combination. This will enhance the effectiveness of the present method and system in the evaluation of the operation condition of a network.

According to an aspect of the invention, correlation coefficients between each pair of two feature values out of the k feature values are taken, and they are used to generate a histogram for the correlation coefficients between each pair of two feature values. Thus, it is possible, as compared with other methods (e.g., those depending on the evaluation using a main component coordinate, or a model based on the average or variance of correlation coefficients), to reduce the loss of information with regard to the normal operation condition of a network.

According to an aspect of the invention, a special attention is paid to combinations of feature values that are determined to be anomalous, and the anomaly severities of individual combinations are evaluated independently of each other. Thus, the method and system are particularly effective for identifying the cause responsible for the occurrence of an anomaly of interest, as compared with other methods (e.g., those depending on the main component analysis using a main component coordinate upon which the correlation coefficients between each pair of feature values are plotted).

According to an aspect of the invention, a matrix constituted of the occurrence probabilities of correlation coefficients, the total number of elements whose values are equal to or less than a threshold is counted, or the total number of elements for each column or for each row whose occurrence probabilities are equal to or less than a threshold is counted, and the severity of an anomaly of interest is quantitatively determined based on the count, and this calculation method enhances the severity of anomaly of each column or each row. Thus, the inventive method or system allows the readier identification of the cause of an anomaly as compared with the conventional method or system.

According to an aspect of the invention, plural probability distribution vectors representing a similar anomaly are gathered, and unified into a single profile, and then the similarity of the probability distribution vector of an incident of interest to that profile is evaluated. Thus, it is possible to readily estimate the cause of an anomaly, which will reduce the time necessary for the research to be undertaken for the search.

According to an aspect of the invention, when matrices A and B both constituted of the occurrence probabilities of correlation coefficients are compared, the number of elements whose values are equal to or less than a threshold is counted for each of the matrices, the number of A-B combinations is calculated where the number of subthreshold elements is the same, and the similarity of matrices A and B is quantitatively determined based on the calculation result. This makes it possible to readily estimate the cause of an anomaly, which will reduce the time necessary for the research to be undertaken for the search.

According to an aspect of the invention, it becomes possible to readily grasp the change of the overall state of a network only by taking a cursory look at relevant pictures, which is realized by visualizing the change of the operation state of a network via the change of colors displayed in relevant pictures. This makes it possible to take a proper measure promptly whenever an anomaly occurs. Each time an anomaly or intrusion occurs, pictures representing the anomaly or intrusion are stored and accumulated into a database. Thus, it will be possible, if there occurs an anomaly, to readily grasp the contemporary state of a network at large by taking a cursory look at relevant pictures. This will help to increase the efficiency of network management.

BRIEF DESCRIPTION OF THE DRAWINGS

FIG. 9 illustrates correlation coefficient histograms obtained from an experiment. The histogram represents the probability distribution of correlation coefficients between two feature values shown.

FIG. 10 illustrates an example where anomalous scores were observed during the experimental period.

FIG. 17 illustrates an exemplary image of a matrix constituted of the occurrence probabilities of correlation coefficients obtained during the outbreak of an anomaly.

FIG. 18 illustrates another exemplary image of a matrix constituted of the occurrence probabilities of correlation coefficients obtained during the outbreak of an anomaly.

FIG. 19 illustrates an exemplary detection of an anomaly resulting from a certain traffic type.

FIG. 20 illustrates the traffic damp data of the host which transmitted the affected packets detected in a case where s=2.

FIG. 21 illustrates an exemplary erroneous detection of an anomaly observed only in a case where s=1.

FIG. 22 shows the dates at which similar incidents occurred, and matrices representing the occurrence probabilities of correlation coefficients.

FIG. 23 shows the traffic damp data related with the similar incidents.

REFERENCE NUMERALS

Figure 1:
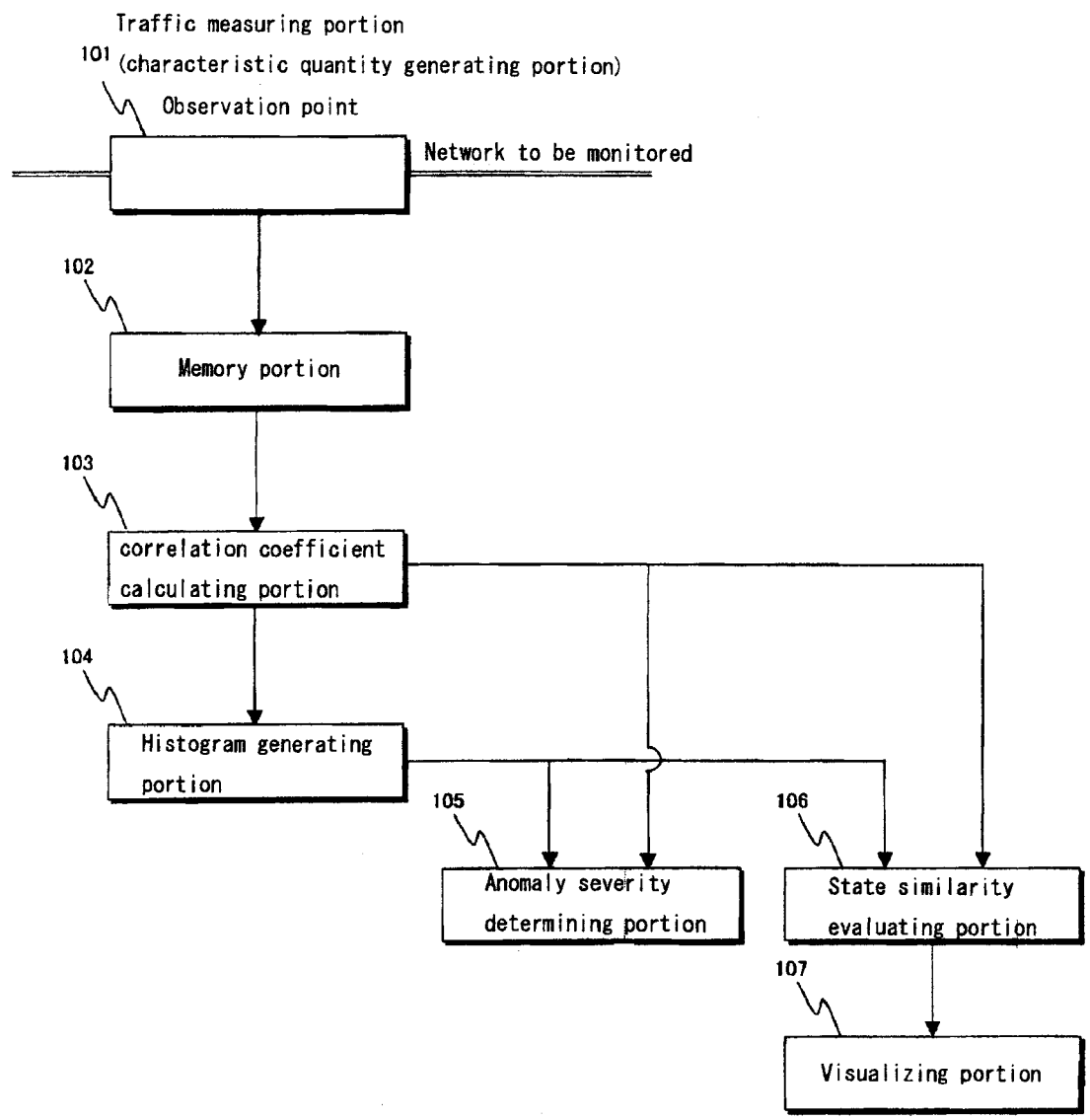
FIG. 1 is a block-diagram outlining the composition of a network anomaly detection system representing an embodiment of the invention.

101: Traffic measuring portion
102: Memory portion
103: Correlation coefficient calculating portion
104: Histogram generating portion
105: Anomaly severity determining portion
106: State similarity evaluating portion
107: Visualizing portion

BEST MODE FOR CARRYING OUT THE INVENTION

The network anomaly detection system embodying the present invention will be described below with reference to the attached drawings. However, the present invention is not limited in any way to those embodiments.

FIG. 1 is a block-diagram outlining the composition of a network anomaly detection system representing an embodiment of the invention. As shown in the figure, the system comprises, at an observation point, a traffic measuring portion 101 (feature value generation portion) responsible for counting the number of packets per each time slot classified by the type of traffic with respect to the traffic of a network, to generate the result as a feature value; and a memory portion 102 for storing information about the feature value. The system further comprises a correlation coefficient calculating portion 103 for receiving the information about the feature value stored in the memory portion 102, and calculating correlation coefficients between each pair of feature values classified by the traffic type; a histogram generating portion 104 for receiving the correlation coefficients calculated by the correlation coefficient calculating portion 103 and generating a histogram therefrom; an anomaly severity determining portion 105 for receiving a histogram generated by the histogram generating portion 104 and determines the severity of an anomaly based on the histogram; a state similarity evaluating portion 106 which receives the correlation coefficients between each pair of feature values calculated by the correlation coefficient calculating portion 103, arranges them into a matrix (probability distribution vector), and evaluates the similarity of an anomaly of interest to a reference anomaly using the probability distribution vector; and a visualizing portion 107 for receiving the probability distribution vector (n×n dimensional vector) calculated by the state similarity evaluation portion 106 from the correlation coefficients, assigning a color to each pixel or an element of the matrix representing occurrence probabilities, and obtaining thereby a picture having an n×n dimensional expanse.

The traffic measuring portion 101 (feature value generation portion) monitors the traffic of a network, counts the number of packets per each time slot for each type of traffic, and delivers it as a feature value. Namely, the portion in question classifies packets to k types according to the protocols and flags governing them, takes them as k types of traffics, counts the number of packets for each type of traffic, and takes the result as a feature value of that type of traffic where k represents a natural number equal to or larger than 2.

The correlation coefficient calculating portion 103 receives information about characteristic quantities stored in the memory portion 102, sets a window for trains of packets constituting a pair of characteristic quantities, and calculates a correlation coefficient between the numbers of packets belonging to the respective characteristic quantities falling within the window. Namely, out of k characteristic quantities corresponding to k types of traffics generated by the traffic measuring portion 101 (characteristic quantity generating portion), a pair of characteristic quantities are taken up, and correlation coefficients between the two are calculated by setting a window corresponding to a time slot with a width W, shifting the window for each interval of S time slots, calculating a correlation coefficient for each shift, and repeating the same procedure for the pair of two characteristic quantities. The above procedure is repeated for given two characteristic quantities chosen from the k characteristic quantities. W represents a natural number equal to or larger than 2 and S a natural number.

The correlation coefficient r between two elements x and y can be defined, when $$x=(x_1, x_2, \ldots, x_n)$$

$$y=(y_1, y_2, \ldots, y_n),$$

by the following equation:

$$r = \frac{\sum_{i=1}^{n}(x_1 - \bar{x})(y_i - \bar{y})}{\sqrt{\sum_{i=1}^{n}(x_i - \bar{x})^2 \sum_{i=1}^{n}(y_i - \bar{y})^2}} = \frac{C(x, y)}{\sigma(x)\sigma(y)} \quad (1)$$

where $\bar{x}$ and $\bar{y}$ represent the averages of the elements x and y, respectively. The correlation coefficient r takes a value in the range of $-1 \leq r \leq 1$. When r takes a value more close to 1, it can be said that the two elements are more strongly correlated.

If the correlation coefficient calculating portion 103 encounters a combination of two feature values for which calculation of the correlation coefficients is impossible, it defines an exempt value as a correlation coefficient for such an abortive combination. The combination, which rejects the calculation of correlation coefficients, may include a case where a group of involved packets to be captured within the window cannot be observed in any way for some reason, or a case where a group of involved packets within the window remain constant. However, the incidence of such a case is important for the evaluation of the state of a network, and thus an exempt value (a value out of the range of −1 to +1) is introduced for defining the correlation coefficient of such an abortive combination. Such an exempt value is necessary when the histogram generating portion 104 generates a histogram of correlation coefficients including even the data from an abortive combination.

The histogram generating portion 104 takes correlation coefficients between each pair of two feature values out of the k feature values provided by the correlation coefficient calculating portion 103, and generates a histogram for the correlation coefficients between each pair of two feature values. Utilizing the fact that correlation coefficients distribute in the range of −1 to +1, the portion 104 introduces, within the range, classes having a width of a certain value (e.g., 0.1), and generates a histogram representing the occurrence probabilities of correlation coefficients classified by classes for each pair of two feature values out of the k feature values. If there is any exempt correlation coefficient whose value is out of the above range of −1 to +1 as described above, the portion 104 introduces an abortive class to include any correlation coefficients obtained from such abortive combinations, and generates a histogram including the occurrence probabilities of such exempt correlation coefficients. The resulting histograms are referred to as a correlation coefficient histogram, which is used for defining the normal operation state of a network.

The anomaly severity determining portion 105, as its first function, defines in advance a correlation coefficient histogram provided by the histogram generating portion 104 which represents the normal operation state of a network, and when an anomaly occurs, fetches the correlation coefficients between a pair of feature values provided by the correlation coefficient calculating portion 103, obtains a histogram derived therefrom, compares the histogram with the above reference histogram, and evaluate the severity of the anomaly based on the comparison.

The anomaly severity determining portion 105 comprises means for receiving, as the second function of the portion, the correlation coefficients between each pair of two feature values calculated by the correlation coefficient calculation portion 103, arranging them into a matrix, converting the matrix constituted of correlation coefficients into a matrix constituted of the occurrence probabilities of correlation coefficients, using a model histogram defined in advance as above for each pair of two feature values which represents the normal operation state of a network, and means for quantitatively determining the severity of an anomaly of interest by counting, for the matrix constituted of the occurrence probabilities of correlation coefficients, the total number of elements whose values are equal to or less than a threshold, or counting, for the matrix constituted of the occurrence probabilities of correlation coefficients, the total number of elements for each column or for each row whose occurrence probabilities are equal to or less than a threshold.

As its first function, the state similarity evaluating portion 106 estimates the cause of an incident by using means which takes the correlation coefficients between each pair of two feature values calculated by the correlation coefficient calculation portion 103, expresses them as a matrix, converts the matrix constituted of correlation coefficients into a corresponding probability distribution vector, using a model histogram defined in advance for each pair of two feature values which represents the normal operation state of a network, gathers plural probability distribution vectors representing a similar anomaly, unifying them into a single profile by calculating the average of them or clustering them, evaluating the similarity of the probability distribution vector of the incident of interest to that profile. For this purpose, the similarity evaluating means calculates a Euclidean distance between the probability distribution vector used for the definition of the profile above, and the probability distribution vector of the incident of interest, and uses the Euclidean distance as an indicator representing the similarity of the incident to the anomaly. Thus, the portion 106 determines, when the Euclidean distance is small, an incident happens that is very similar to the anomaly referred to.

As its second function, the state similarity evaluating portion 106 comprises means for taking the correlation coefficients between each pair of two feature values calculated by the correlation coefficient calculation portion 103, expressing them as a matrix, converting the matrix constituted of correlation coefficients into a matrix constituted of the occurrence probabilities of correlation coefficients, and means for counting, when comparing matrices A and B both constituted of the occurrence probabilities of correlation coefficients, the number of elements whose values are equal to or less than a threshold for each of the matrices, calculating the number of A-B combinations where the number of subthreshold elements is the same, and quantitatively determining the similarity of matrices A and B based on the calculation result.

The visualizing portion 107 visualizes the change of the operation state of a network by taking each combination of two feature values as representative of a pixel, deriving the pixel value from the probability distribution vector (n×n dimensional vector) calculated from the correlation coefficients by the state similarity evaluation portion 106, assigning a color to each of the occurrence probabilities constituting the matrix, and obtaining thereby a picture having an n×n dimensional expanse, and visualizing the change of the operation state of a network by tracking the change of colors displayed in the picture.

Figure 2:
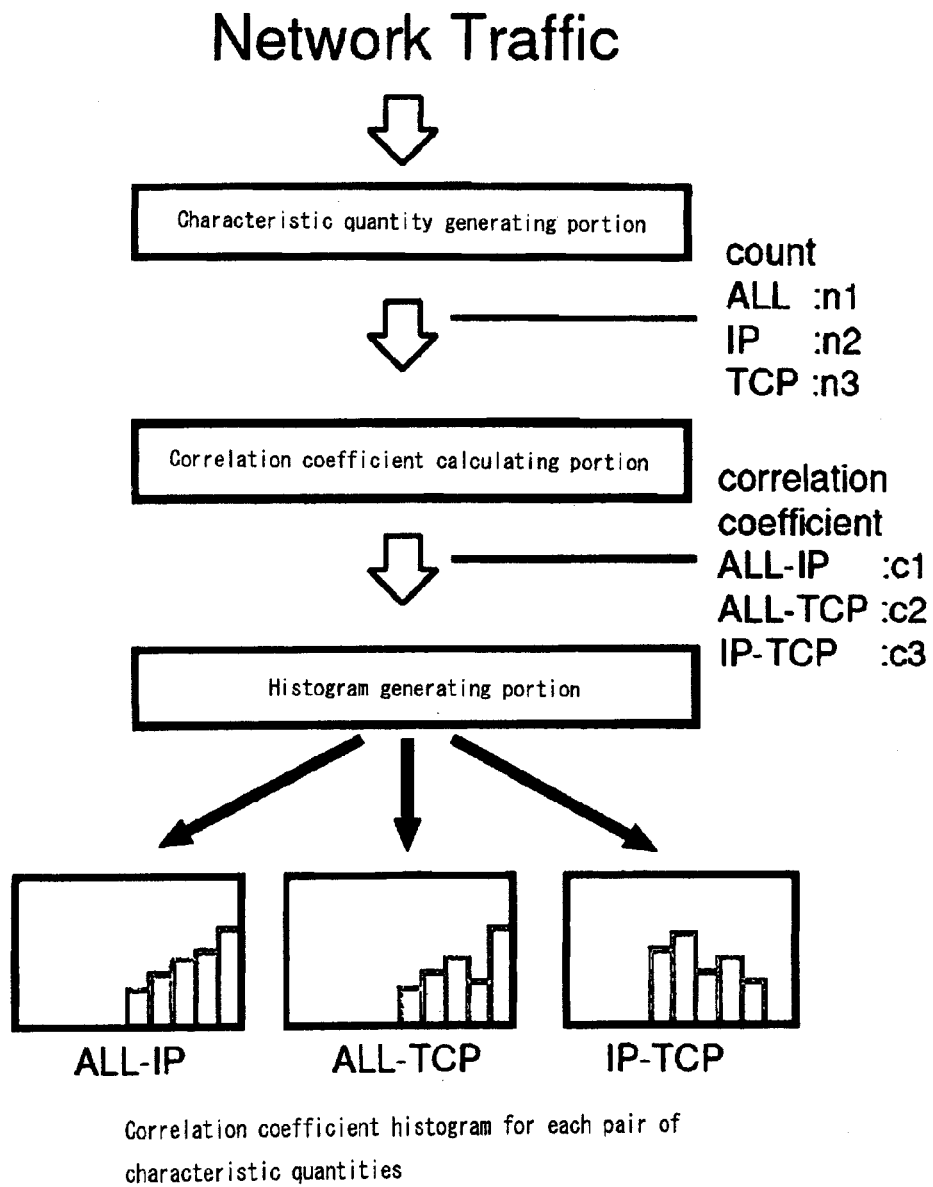
FIG. 2 is a flowchart outlining the steps for the generation of a correlation coefficient histogram between each pair of feature values.

FIG. 2 is a flowchart showing how a correlation coefficient histogram is obtained from the correlation coefficients between any two chosen from the three feature values including the number of all packets (ALL), the number of IP packets (IP), and the number of TCP packets (TCP).

(1) The feature value generating portion observes the traffic of a network, counts the numbers of packets classified by the types of traffics defined in advance, and generates the number of packets for each type of traffic as a feature value. The feature value consisting of time sequence data is delivered to the correlation coefficient calculating portion.

(2) The correlation coefficient calculating portion receives the time sequence data constituting the feature value from the feature value generating portion, compares the time sequence data of two feature values using a sliding window method, calculates a correlation coefficient for each time interval, and provides a time sequence data of correlation coefficients. For all the combinations of the two chosen from the feature values generated by the feature value generating portion, correlation coefficients are calculated which are then handed to the histogram generating portion.

(3) The histogram generating portion plots the distribution of correlation coefficients between each pair of the two feature values over the full range of correlation coefficient divided by classes, and generates a histogram representing the frequency of correlation coefficients over individual classes. The histogram representing the frequency of correlation coefficients over the range of correlation coefficient, can be converted to a histogram representing the probability distribution, by diving the ordinate values with the total of frequencies. This probability distribution curve is referred to as a correlation coefficient histogram.

(4) If there is an incident to be evaluated, correlation coefficients between two feature values are calculated for a time interval when the incident occurred, and converted to a histogram. It is possible to evaluate the state the incident represents by referring to the histogram.

According to the method, correlation coefficients are calculated for each combination of two feature values, and each combination produces one histogram. Therefore, when there are N feature values, there will be {N*(N−1)}/2 histograms.

Figure 3:
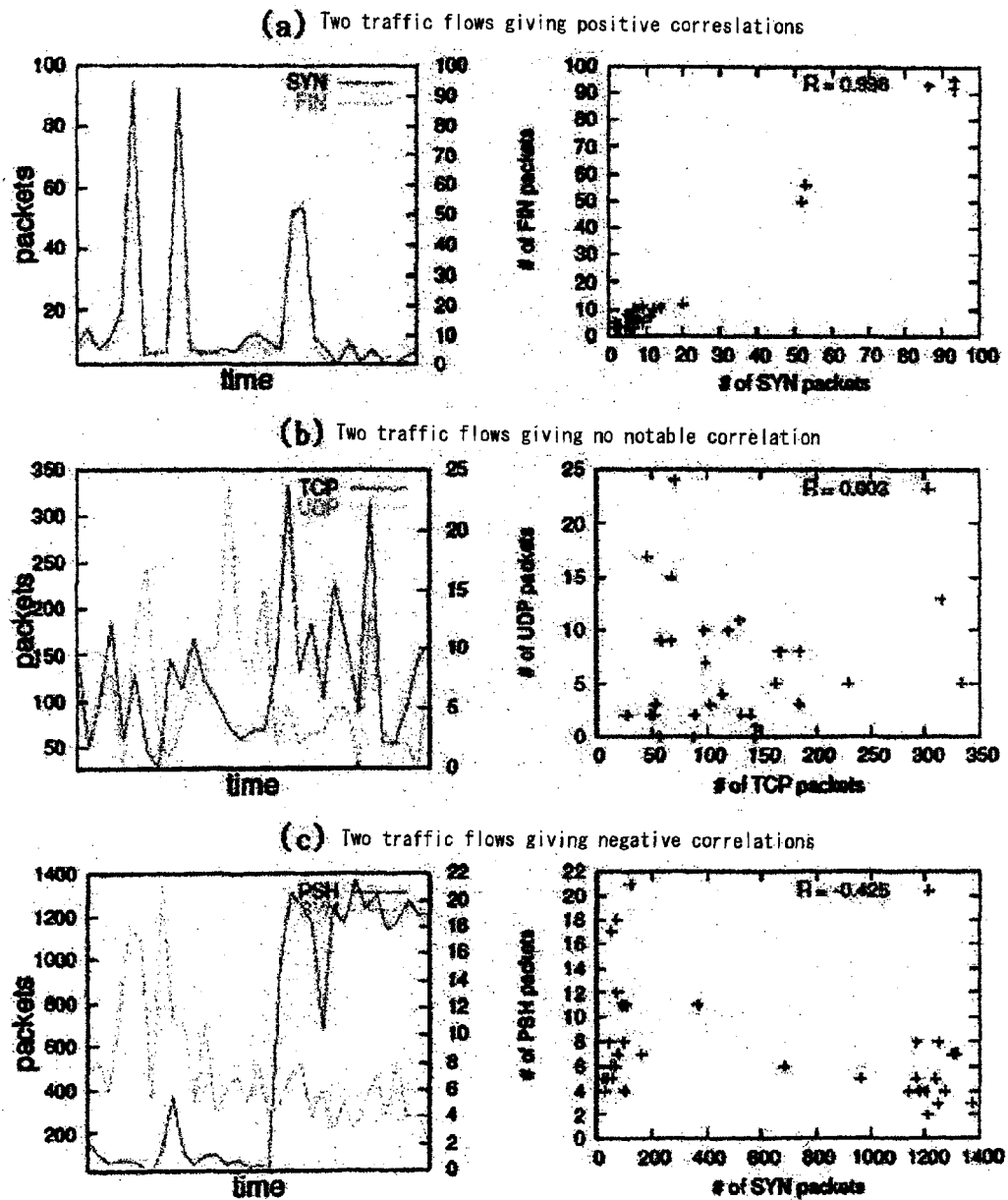
FIG. 3 shows the temporal change of two types of traffic flows and the correlation coefficients observed between them.

The correlation coefficient r between variables x and y can be defined by formula (1), and takes a value between −1 and +1. Since correlation coefficients are calculated for the two types of traffic flows streaming through a network, they vary greatly depending on the number of accesses to the network and their combination. FIG. 3 shows the temporal change of two types of traffic flows and the correlation coefficients observed between them. Positive correlations as shown in FIG. 3(a) are observed when one traffic flow increases/decreases and the other increases/decreases concurrently. The number of SYN packets and the number of FIN packets of which the former is inserted at the beginning of TCP connection and the other at its end show a one-to-one correspondence, and exhibit a strong positive correlation. Two traffic flows giving no notable correlation are as shown in FIG. 3(b) where one traffic flow has no impact on the other flow. TCP and UDP are protocols on IP which are independent of each other, and thus the number of packets governed by TCP or UDP does not have any impact on the number of packets governed by the other protocol as shown in the left panel of FIG. 3(b). An example of two traffic flows that show a negative correlation is shown in FIG. 3(c). The negative correlation is opposite to the positive correlation: when one traffic flow increases/decreases, the other traffic flow decreases/increases concurrently. The left panel of FIG. 3(c) shows, for the packets to which SYN and PSH flags are attached, the variation in their number over time, and the two packet flows exhibit a negative correlation. Although packets with SYN-flag and those with PSH-flag have widely different ordinate values, it is seen that when the former rises, the latter declines and vice versa.

The number of packets belonging to each traffic type contained in traffic varies greatly dependent on the behavior of users currently gaining access to a network, and thus there is an occasion where one can observe no packet within the observation window for a certain type of traffic. In that case, calculation of a correlation coefficient of that traffic type with another traffic type becomes impossible. However, the incidence of such a case serves as important information for the detection of an anomaly reflecting the behavior of current users as well as the operation condition of individual hardware components of the network. To include such an incident in the evaluation of a network, a class of correlation coefficients equal to or larger than 1.1 is introduced so that the incidents as described above can be included in the calculation of correlation coefficients. Another case where calculation of correlation coefficients is rejected includes, for example, two variables either one of which consists of elements having the standard deviation s=0. To include such a case, correlation coefficients r's defined as below are introduced to provide an exempt class.

$r=1.1$ ($s(x)=0$ and $s(y)=0$)

$r=1.2$ ($s(x)=0$ and $s(y)\neq 0$)

$r=1.3$ ($s(x)\neq 0$ and $s(y)=0$)

Figure 4:
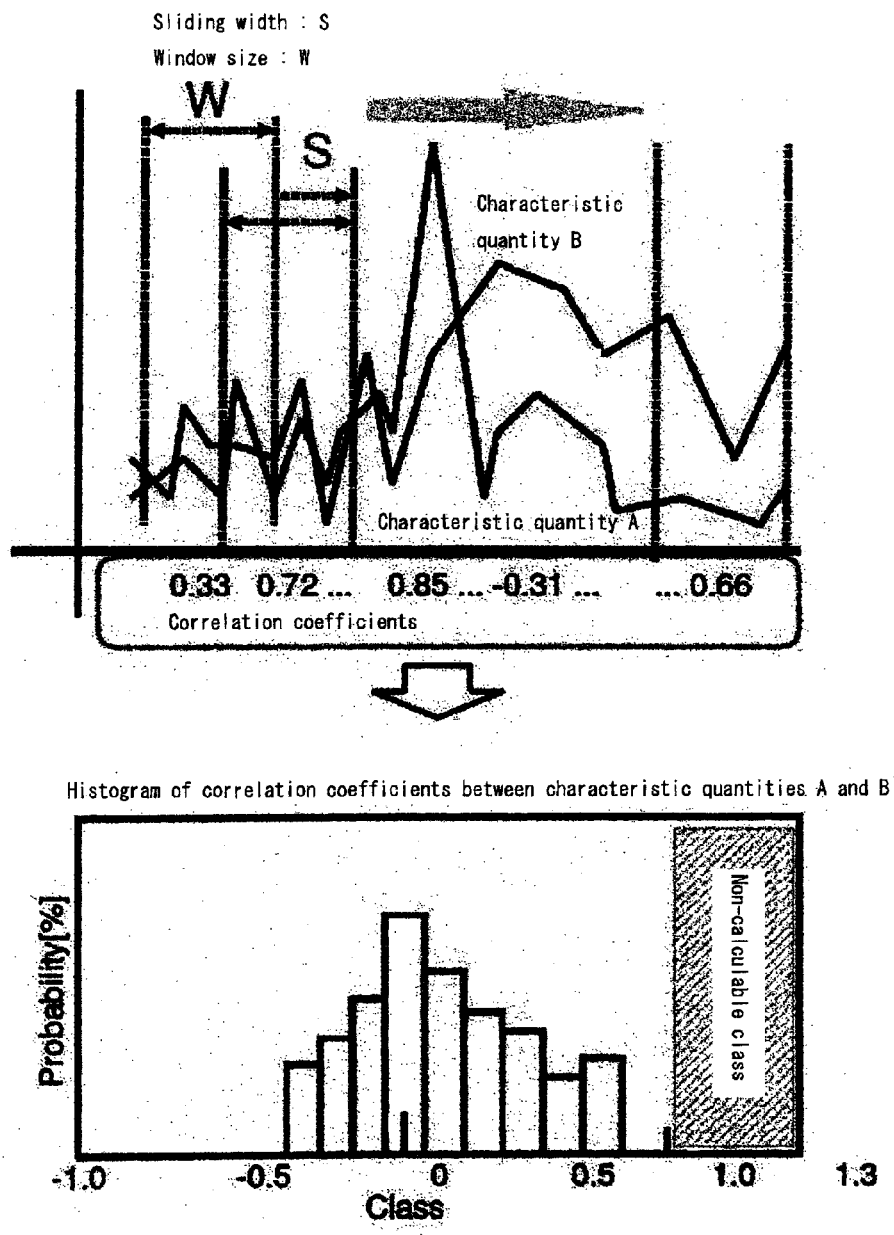
FIG. 4 illustrates how correlation coefficients are generated using a sliding window method.

Next, how to calculate a correlation coefficient will be described. The correlation coefficient calculating portion 103 calculates a correlation coefficient using a sliding window method, allowing for the temporal change of the operation state of a network (FIG. 4). The portion 103 sets a window having a width W in relation to the time sequence data of two feature values, and calculates a correlation coefficient between the two time sequence data falling within the first window. Then, the portion 103 shifts the window by a time slot S, and calculates again a correlation coefficient between the two time sequence data falling within the shifted window. The portion 103 repeats the same procedure to produce a series of correlation coefficients, which are then delivered to the histogram generating portion. The histogram generating portion prepares, from the correlation coefficient data, a histogram plotting the frequencies of correlation coefficients distributed over classes each having a specified width. The resulting histogram, which is referred to as a correlation coefficient histogram, represents the occurrence probabilities of individual correlation coefficients. The inventive method defines the normal operation state of a network based on the correlation coefficient histogram, and evaluates the current state of a network by comparing the current histogram with the model histogram. Since the histogram generating portion generates a histogram for each pair of two feature values, it will provide, when there are N feature values, $\{N*(N-1)\}/2$ histograms. The normal operation state of a network will be defined for each of the histograms. In stead of the main component analysis where the correlation coefficients derived from all possible combinations of feature values are plotted along a main component coordinate, the inventive method takes the correlation coefficients between each pair of two feature values separately, so that the method can obtain effective information for the identification of the cause of an anomaly.

Figure 5:
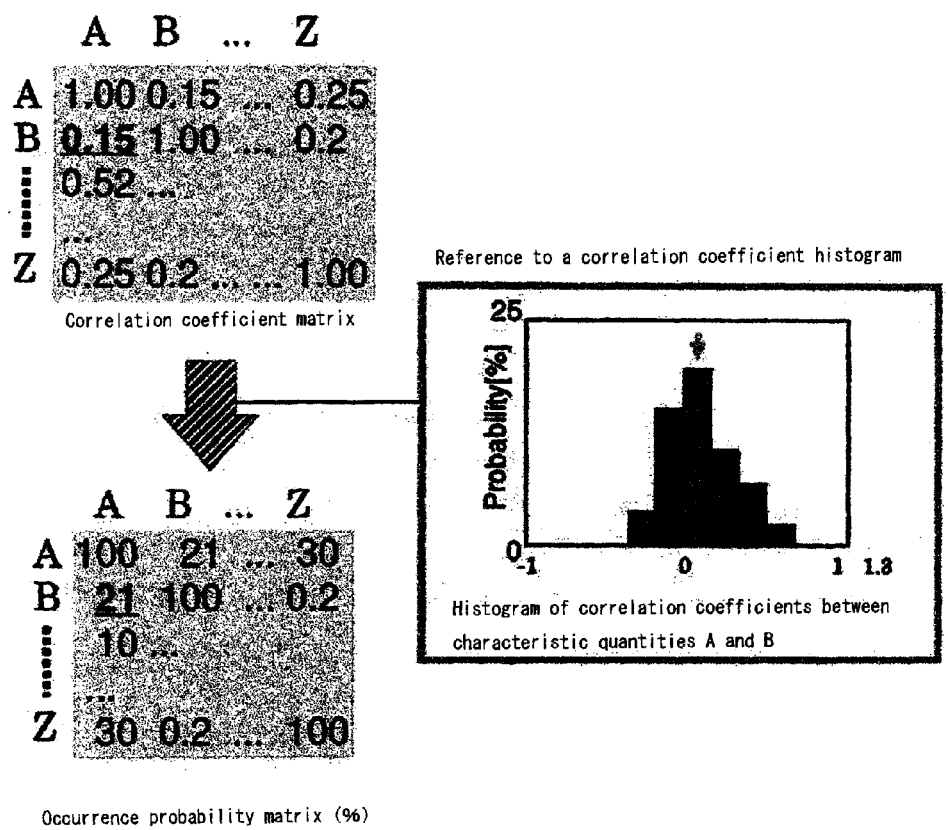
FIG. 5 illustrates the method how to calculate the occurrence probabilities of correlation coefficients using a correlation coefficient histogram.

Next, the method how to evaluate the state of a network will be described. The inventive method achieves two kinds of evaluations: detection of an anomaly in a network, and the similarity of an anomaly of interest to a reference anomaly. For both evaluations, the inventive method utilizes correlation coefficients between each pair of two feature values obtained during a relevant time interval. Instead of using the correlation coefficients as they are, the inventive method calculates, based on a correlation coefficient histogram generated before, the occurrence probabilities of correlation coefficients as shown in FIG. 5, and uses them as an indicator for evaluation. This is because the inventive method uses, for the evaluation of an incident, the probability of its occurrence in a network as an indicator, rather than the correlation coefficients between two characterizing quantities characterizing the incident. The occurrence probability of an anomaly represents the severity of the anomaly: when the occurrence probability of a correlation coefficient is high, it indicates that the correlation coefficient is rather common, and close to normal whereas when the occurrence probability of a correlation coefficient is low, the correlation coefficient is rather uncommon, and far from normal. The inventive method uses the occurrence probability as an indicator for evaluating the severity of an anomaly in a network.

Figure 6:
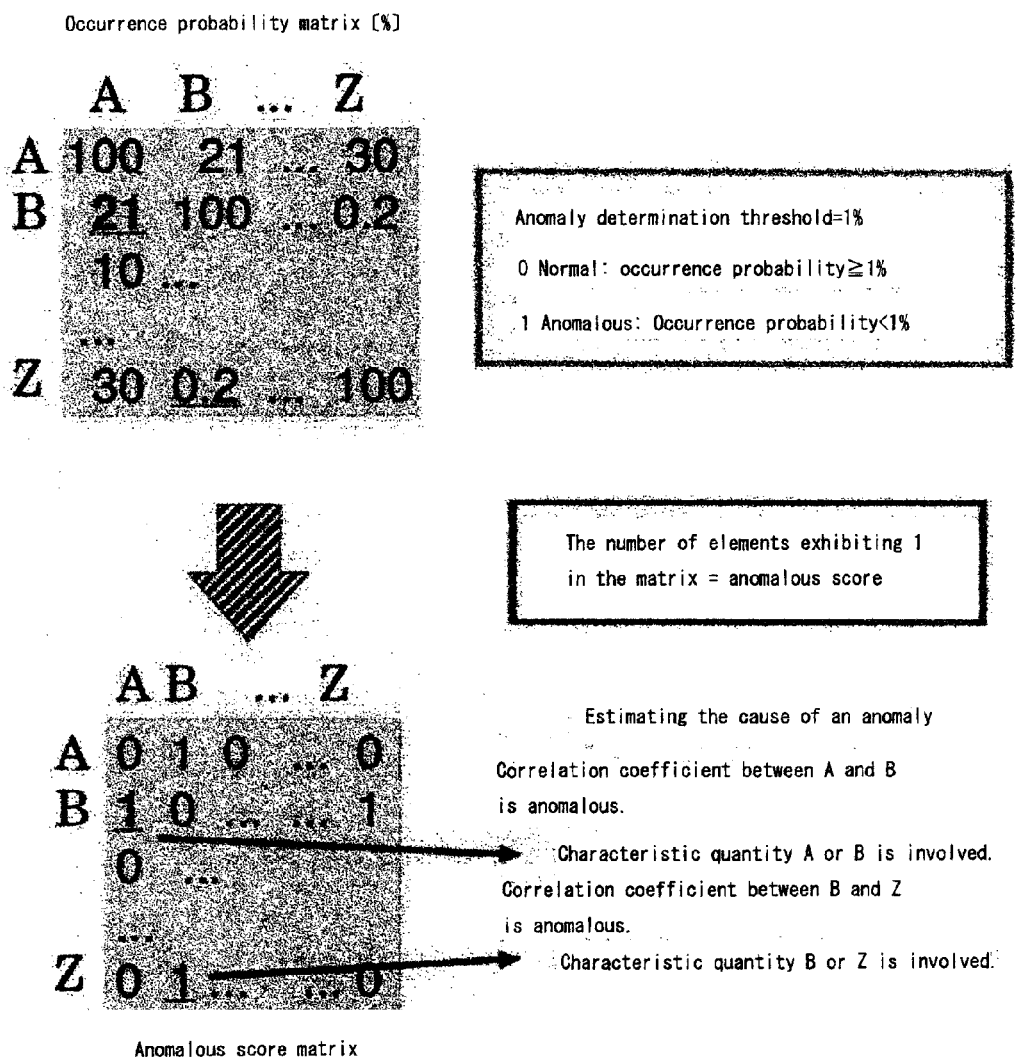
FIG. 6 illustrates the methods how to calculate an anomalous score based on correlation coefficients, and how to identify the cause of an anomaly of interest.

Detection of an anomaly in a network achieved by the anomaly severity determining portion 105 of FIG. 1 will be described. Quantitative determination of an anomaly is achieved by two methods. The first method takes the occurrence probabilities derived from the correlation coefficients between each pair of two feature values obtained during the development of an incident of interest, compares them with the reference occurrence probabilities, and determines, when the difference between the two is beyond a specified limit, that the incident is an anomaly. The inventive method counts, for a given window, the number of occurrence probabilities determined to be anomalous, and takes the number as an anomalous score of that window. When there is a time interval where many windows exhibit anomalous scores, the method takes it indicates, during that time interval, many combinations of feature values exhibit correlation coefficients far from the normal, that is, many combinations of feature values have relationships to each other that are rarely observed during the normal operation of a network, that is, there occurs an anomaly in the network during that time interval. In stead of the main component analysis where the correlation coefficients derived from all possible combinations of feature values are plotted along a main component coordinate, the inventive method takes the correlation coefficients between each pair of two feature values separately. Thus, when the inventive method finds many windows having high anomalous scores, and seeks to identify the cause of the suspect anomaly, it identifies combinations providing anomalous correlation coefficients by investigating one by one the correlation coefficients observed during the occurrence of the suspect anomaly, and pays its attention to the particular combinations providing anomalous correlation coefficients, to identify the cause responsible for the suspect anomaly (FIG. 6).

The second method for detecting an anomaly by evaluating the state of a network will be described. For each of the windows observed during the development of an anomaly of interest, the method calculates the occurrence probabilities of correlation coefficients between each pair of two feature values, based on a histogram generated in advance as a model representing the normal operation state of a network, and generates a matrix constituted of the occurrence probabilities as its elements (matrix of the occurrence probabilities of correlation coefficients). When the correlation coefficient between two observed quantities of two different feature values i and j within a window is expressed as $r_{ij}$, the element $p_{ij}$ constituting a matrix of the occurrence probabilities of correlation coefficients can be expressed as follows:

$$p_{ij}=h_{ij}(r_{ij}) \quad \text{(Formula 2)}$$

where $h_{ij}$ represents a histogram of correlation coefficients observed between the two different feature values i and j. The anomaly severity (AS) of an incident can be calculated from the matrix of the occurrence probabilities of correlation coefficients defined as above. The AS of an incident can be determined by counting, for the occurrence probabilities of correlation coefficients between feature value i and another feature value, the number of the elements whose value is equal to or smaller than a threshold, and repeating the same procedure for all the combinations derived from the available feature values as follows:

(Formula 3)

If it is assumed that $\theta$ represents a threshold by which one can determine whether a given element $p_{ij}$ is anomalous or not, $as_{ij}$ is defined as follows:

$$1, p_{ij} \cdot \theta$$

$$as_{ij}=0, p_{ij}>\theta \quad \text{(Formula 4)}$$

Formula (3) represents, for the occurrence probabilities of correlation coefficients between feature value i and another feature value, the number of the occurrence probabilities, which are anomalously low, which is then summed and multiplied to the power of s. In the formula, s represents sensitivity, and is introduced to enhance the number of anomalous elements obtained for feature value i. The anomaly severity (AS) takes a higher value, as the number of anomalous correlation coefficients becomes larger. Thus, according to this method, it is possible to identify the cause of an anomaly by specifying the combinations of feature values that give a higher number of anomalous correlation coefficients.

Next, evaluation of the similarity of network states achieved by the state similarity evaluating portion 106 of FIG. 1 will be described. As described above, evaluation of the similarity of network states is achieved by two methods. To evaluate the similarity of network states, the first method uses probability distributions derived from the occurrence probabilities of correlation coefficients between each pair of two feature values. The method converts the probability distributions to a probability distribution vector, and evaluates the state of each window using the probability distribution vector.

Figure 7:
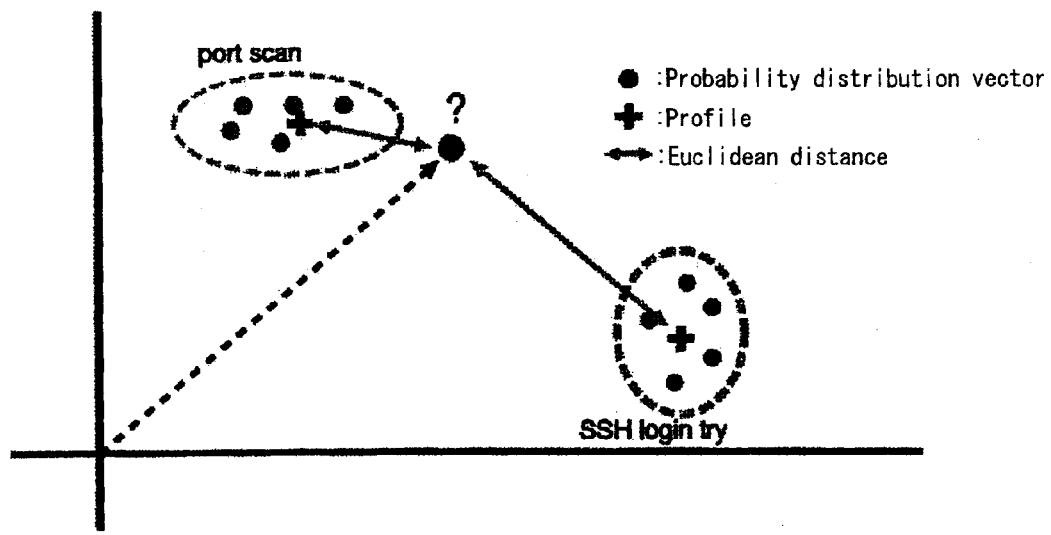
FIG. 7 illustrates a probability distribution vector.

If a state of interest is similar to a reference state, the probability distributions of the two states derived from the respective occurrence probabilities of correlation coefficients during the relevant time interval will be similar, and thus the two probability distribution vectors will be positioned close to each other in a vector space. From these considerations, the inventive method takes two probability distribution vectors obtained at a time interval during which the two states to be compared occur, calculates an Euclidean distance between the two vectors in a vector space, and evaluates the similarity of the two states using the result. Namely, the method determines the two states are similar when the Euclidean distance is small, while it determines the two states are different when the Euclidean distance is large (FIG. 7).

When plural probability distribution vectors obtained from similar anomalies are gathered, they may be unified into a single profile by calculating the average of them or clustering them. If a probability distribution vector obtained from a state of interest is apart, by a small Euclidean distance, from a profile established for some probability distribution vectors representing a certain common state, it can be said that the state of interest is similar to the common state. Thus, it is possible to detect an anomaly by determining a Euclidean distance of the probability vector of an incident of interest from the probability vector of a reference state. The reverse may be possible. If plural probability distribution vectors obtained from similar normal states are gathered, they may be unified into a single profile representing a common normal state, and the profile may be used for defining a normal state.

In the above embodiment, the Euclidean distance between two vectors is used as an indicator for evaluating the similarity of the states responsible for the two vectors. However, evaluation of the similarity of two states may be achieved using other indicators including a weighted Euclidean distance, city-block distance, Mahalanobis distance, inner product, etc.

Next, the second method for evaluating the similarity of two states of a network will be described. The similarity S between two matrices A and B both constituted of the occurrence probabilities of correlation coefficients is defined by formula (5) below:
(Formula 5)
where θ is a threshold by which one can determine whether a given element is anomalous or not, as mentioned above in relation to formula (4). According to formula (5), if the elements exhibiting an anomalous value are similar between matrices A and B, the two matrices will have a high similarity.

EXAMPLES

Verification Experiment 1

Next, an experiment will be described to verify how the anomaly severity determining portion 105 of FIG. 1 works in the treatment of traffic flowing through a network in operation.

Figure 8:
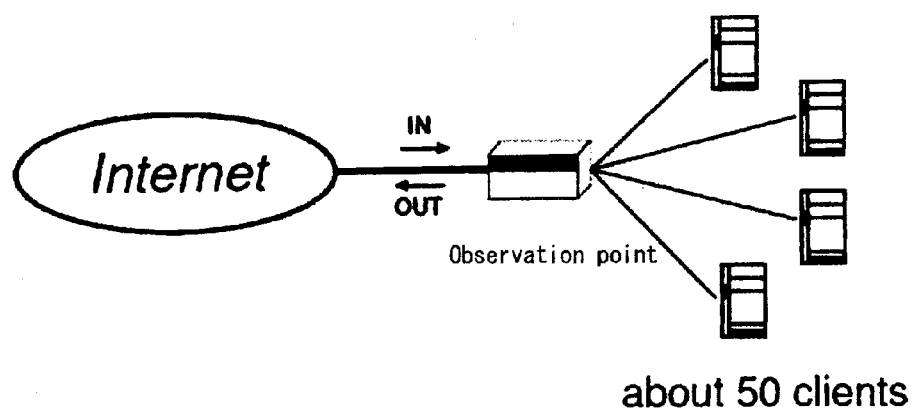
FIG. 8 shows the composition of an experimental network.

First, the first method for evaluating the state of a network for detecting an anomaly as mentioned above will be described. The network used in this experiment is a LAN where about 50 hosts are connected in a configuration as shown in FIG. 8.

For the calculation of correlation coefficient, each time slot has a width of 10 seconds; the sliding window has a width corresponding to 30 time slots; and the sliding distance is equal to 5 slots. The experiment was started at a certain day of May, 2005, and a group of histograms were generated daily. The correlation coefficient histogram stands on classes having a width of 0.1. The traffic was divided according to the types described below, and packets within each time slot were counted divided by the types of traffic. The threshold required when it is necessary to determine whether a given occurrence probability of correlation coefficient is anomalous or not, was set to 1%.

Generally, as more feature values are implemented for analysis of the traffic of a network, it becomes easier to identify the cause of an anomaly in the network.

All
Classified by protocols
Layer 3 (IP, ARP, other Ether frame)
Layer 4 (TCP, UDP, ICMP, other IP packet)
TCP flag (URG, ACK, PSH, RST, SYN, FIN)
Classified by ports
TCP (20, 21, 22, 25, 80, 143, 443)
The other range excluding the above divided into 9 sections (0-79, 81-109, 111-142, 144-442, 444-1023, 1024-2999, 3000-5999, 6000-9999, 10000-65535)
UDP (53, 123, 520)
The other range excluding the above divided into 6 sections (0-52, 54-122, 124-519, 521-1023, 1024-9999, 10000-65535)

TABLE 1

Individual port numbers and the name of services

| Port Number | Service | Port Number | Service |
|---|---|---|---|
| TCP | | | |
| 20 | FTP data | 21 | FTP control |
| 22 | SSH | 25 | SMTP |
| 80 | http | 110 | pop3 |
| 143 | imap | 443 | https |
| UDP | | | |
| 53 | DNS | 123 | ntp |
| 520 | RIP | | |

For TCP and UDP, packets are counted for individual ports only in relation to principal applications (Table 1), and for other ports, with an emphasis put on the detection of an anomaly, packets are counted for each of the nine-divided sections for TCP, or for each of the six-divided sections for UDP. The section width is set such that the ports up to 1024, which are utilized heavily and called a well-known port have finer sections while the upper ports have wider sections. As described above, according to the inventive method, time slots having no packet can be assigned to an exempt class and treated in the same manner as with other time slots with packets. Since time slots having no packet reflect the important change of traffic of a network, this treatment is thought advantageous because it will ensure the versatility of the inventive method. For each of the ports to be monitored, it is desirable to know in advance the number of arrival packets through a preliminary survey. If a user provides for the first time a service through a network, the user's terminal is likely to be exposed to unauthorized accesses because of its vulnerability. To avoid such attacks, it is advisable to add a personal port number to existing feature values. Ports are distinguished according to the direction in which information therethrough flows with respect to a network of interest. As shown in FIG. 8, packets flowing out from a network of interest is termed "IN," while packets flowing into the network is termed "OUT." Thus, for this experiment, 132 feature values were used in total, and 8646 (=132*(132-1)/2) histograms used to define a normal operation state of a network.

Since the inventive method depends on the correlation coefficients between a combination of two feature values for the detection of an anomaly in a network, any combination that will reject the calculation of correlation coefficients was excluded from the study in advance. Specifically, all the feature values contributing to the generation of a histogram were inspected, and the average occurrence probability of correlation coefficients falling with 1.1 class was determined. When the average occurrence probability in question was found to be equal to or larger than 80%, the relevant feature values were excluded from the preparation of a histogram.

Some exemplary correlation coefficient histograms obtained from the traffic data gathered from a network over one month are shown in FIG. 9. The histogram shown in FIG. 9 is obtained from the combination of TCP packets addressed to port 22, with TCP-SYN, -FIN, or, -PSH, or UDP out of the traffic flowing into a network of interest. A feature value consisting of packets is expressed hereinafter in terms of the governing protocol of the packets, and their direction and type as follows.

$$\text{Protocol}^{direction}/_{type}$$

The "direction" signifies the direction in which the packets flows with respect to a network of interest: when the packets flow out of a network of interest, their direction is "IN," and when the packets flow into the network, their direction is "OUT." The "type" signifies the type of TCP-flag, or port number. When the "type" signifies a port number, it also indicates whether the port is for a sender (src) or for a destination (dst). When the "type" further relates to an application or protocol such as SSH or HTTP, it includes a string representing the application or protocol. When the "type" is represented by ALL, it indicates that all the packets governed by the protocol are included.

It is seen from FIG. 9 (left upper panel) that the combination between:

$TCP^{IN}/_{SYN}$ packets and $TCP^{IN}/_{FIN}$ packets has a strong correlation. This can be expected from the roles of SYN and FIN packets, which indicate the start and end of a data sequence, respectively, and is related with a normal state of a network. With regard to the combination between:

$TCP^{IN}/_{PSH}$ packets and $TCP^{IN}/_{SYN}$ packets, the correlation coefficients generally take positive values and distribute evenly over the range. It is likely that the histogram represents the characteristic of TCP for which the number of packets increases in proportion to the number of accesses to a network of interest (right upper panel of FIG. 9).

With regard to the combination between: $TCP^{IN}/_{ALL}$ packets and $UDP^{IN}/_{ALL}$ packets, the correlation coefficients distribute rather evenly with no predilection towards positivity or negativity (left lower panel of FIG. 9). Since no common restrictions are imposed to the TCP- and UDP-governed packets, basically the two kinds of packets have no correlation as indicated by the histogram.

With regard to the combination between:

$TCP^{IN}/_{ALL}$ packets and $UDP^{IN}/_{dst:SSH}$ packets, a larger number of correlation coefficients fall within the class of 1.1 (right lower panel of FIG. 9). This indicates that the requests for SSH communication to an internal host from the network outside are very small in number, which rather reflects the normal state of the network. However, such a histogram is likely to be excluded from the data used for the detection of an anomaly for the reason cited above.

As seen from above, it can be said that the histogram of correlation coefficients between each pair of two feature values satisfactorily reflects the operation state of a network. If histograms obtained from the correlation coefficients between a large number of combinations indicate that the occurrence probabilities of those correlation coefficients are generally low, it indicates that the network probably falls in a state far from the normal.

Next, an exemplary case where an anomaly is detected will be described. In this verification experiment undertaken for the detection of an anomaly, the threshold by which one can determine whether a given occurrence probability of correlation coefficient is normal or not was set to 1%. If a given occurrence probability is below 1%, that probability is determined to be anomalous. As described above, for a given window, the number of occurrence probabilities observed within the window that are below 1% was taken as a anomalous score of the window.

FIG. 10 is an exemplary plot of anomalous scores traced over one day. It can be seen from the figure that the anomalous score changes incessantly over the day, and the operation state of a network changes incessantly, too. It also can be seen that high anomalous scores appear occasionally with a certain interval between them. Finding that there were a number of high anomalous scores during the study period, it was decided to make a detailed survey of the traffic data in the windows adjacent to the occurrence of each anomalous score.

Example 1

Large Scale Scan

In certain windows, scanning was found to occur at a specific port of all the hosts, and scanning was also found to occur at various ports of some hosts. For the windows in question, correlation coefficients of a considerable number of combinations exhibited anomalous values, and particularly the majority of the combinations with a high anomalous score include one of the following three feature values:

$TCP^{IN}/_{dst:144-1023}$, $TCP^{IN}/_{dst:1024-2999}$, $TCP^{IN}/_{SYN}$

Figure 11:
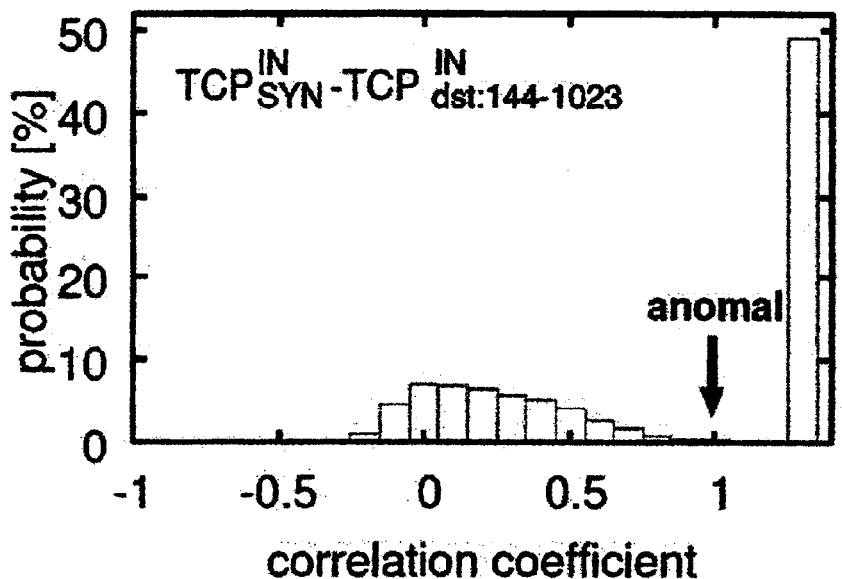
FIG. 11 illustrates a correlation coefficient histogram obtained between $TCP^{IN}/_{SYN}$ and $TCP^{IN}/_{dst:144-1023}$ in an experiment.

For example, the combination:

$TCP^{IN}/_{SYN}$ and $TCP^{IN}/_{dst:144-1023}$ rarely shows a strong correlation during the normal operation state of a network. However, as shown in the correlation coefficient histogram shown in FIG. 11, the correlation coefficients observed during the windows in question have a value as high as 0.98. In view of this, a survey was performed on the traffic observed during those windows with a special attention paid to the two feature values, and it was found that large scale scanning due to SYN packets was detected as mentioned above. Moreover, the number of the port to which one feature value that was found anomalous is related corresponds to that of the port exposed to the scanning attack. Thus, it was found that it is possible to locate the site of an anomaly by paying attention to the combination of feature values involved in the anomaly.

Example 2

Login Attempts to SSH (TCP22)

Figure 12:
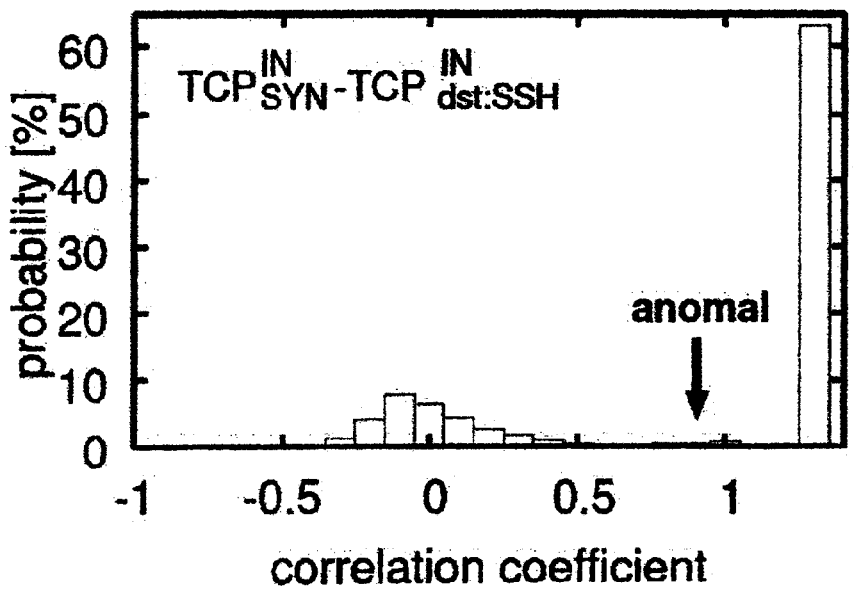
FIG. 12 illustrates a correlation coefficient histogram obtained between $TCP^{IN}/_{SYN}$ and $TCP^{IN}/_{dst:SSH}$ in an experiment.

For other windows involved, login attempts to SSH (port No. 22) were observed for all the hosts. For example, the combination:

$TCP^{IN}/_{SYN}$-$TCP^{OUT}/_{SYN}$ which has normally a strong correlation exhibited only a weak positive correlation. Furthermore, the combination:

$TCP^{IN}/_{dst:SSH}$-$TCP^{IN}/_{SYN}$ which normally rejects the calculation of correlation coefficients exhibited a strong positive correlation with, however, the occurrence probability being very small (FIG. 12).

Example 3

Arrival of Spam Mails

Figure 13:
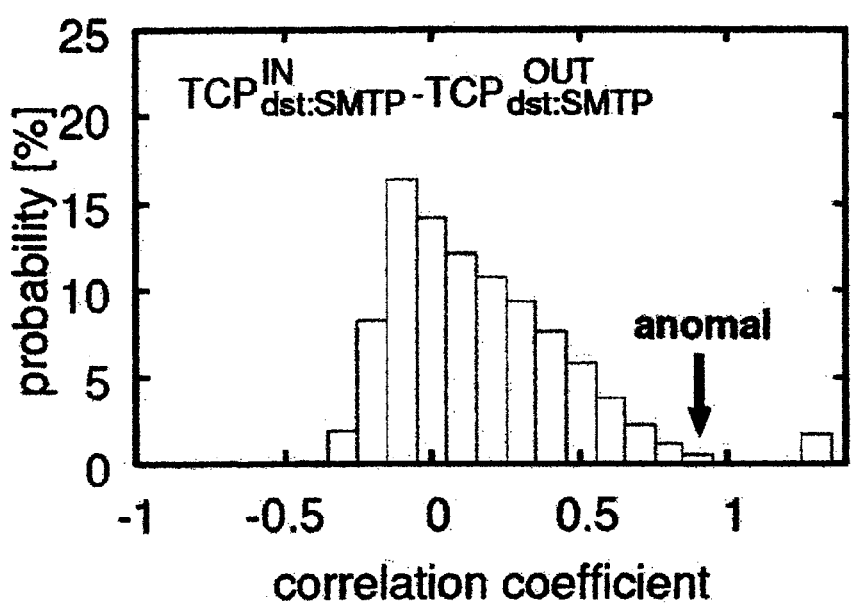
FIG. 13 illustrates a correlation coefficient histogram obtained between $TCP^{IN}/_{dst:SMTP}$ and $TCP^{OUT}/_{dst:SMTP}$ in an experiment.

In other windows, transmission of spam mails from an external source to the inside was confirmed. In this incident, the combination:

$TCP^{IN}/_{dst:SMTP}$ and $TCP^{IN}/_{dst:SMTP}$ exhibited an anomalous correlation coefficient (FIG. 13). This combination hardly shows any notable correlation coefficient during the normal operation of a network, but during the incident the combination in question exhibits a strong correlation coefficient of as high as 0.8, a value that has never been observed normally. In view of this, a survey was made on the involved traffic of the network with attention paid to SMTP port, and it was found that the mail server had received and transmitted plural spam mails practically at the same time. A more detailed survey revealed that setting had been implemented to transmit the mails to the above address inside and then to an address outside.

A table will be presented below where the relationship an incident giving a high anomalous score with the occurrence probabilities of correlation coefficients of an involved feature value.

TABLE 2

Relationship of an anomalous incident with the correlation coefficients of involved feature values

| Incident | Characteristics |
| --- | --- |
| Port scanning onto multiple ports of plural hosts | High anomalous score. Lowered occurrence probabilities of correlation coefficients between involved feature values at the attacked ports |
| Port scanning onto a small number of hosts | Small increment of anomalous scores Lowered occurrence probabilities of correlation coefficients between involved feature values at the attacked ports |
| Attempts to login of SSH | Lowered occurrence probabilities of correlation coefficients between feature values involving SHH, or SYN, FIN, or RST |

Verification Experiment 2

An experiment was performed to verify the second method for evaluating the state of a network for detecting an anomaly as mentioned above, and the result of the experiment will be described below.

The network traffic data used in the experiment was obtained from a network comprising about 50 client PC's, a Web server and an SMTP server, which is connected to the internet, and the in- or out-flows of data of the network with respect to the internet was monitored. The observed data types include 66 types of traffics as shown in Table 3, each of which contains in- and out-flow data, resulting in 132 types of traffics in total. Thus, for this experiment, 132 feature values were used in total, and the number of histograms each used for defining a normal operation state of a network was equal to the number of combinations of every two feature values, i.e., 8646 (=132*(132−1)/2).

TABLE 3

Observed data

| Number | Type of observed data |
| --- | --- |
| 1 | All packets |
| 2-3 | ARP, other Ether frames |
| 4 | IP packets |
| 5-7 | TCP, UDP, ICMP packets |
| 8 | Other IP packets |
| 9-14 | TCP flags (URG, ACK, PSH, RST, SYN, FIN) |
| | Each of TCP source port numbers |
| 15-22 | 20, 21, 22, 25, 80, 110, 143, 443 |
| 23-31 | Range other than the above divided into 9 sections (0-79, 81-109, 111-142, 144-442, 444-1023, 1024-2999, 3000-5999, 6000-9999, 10000-65535) |
| | Each of TCP destination port numbers |
| 32-40 | 20, 21, 22, 25, 80, 110, 143, 443 |
| 40-48 | Range other than the above divided into 9 sections (0-79, 81-109, 111-142, 144-442, 444-1023, 1024-2999, 3000-5999, 6000-9999, 10000-65535) |
| | Each of UDP source port numbers |
| 49-51 | 53, 123, 520 |
| 52-57 | Range other than the above divided into 6 sections (0-52, 54-122, 124-519, 521-1023, 1025-9999, 10000-65535) |
| | Each of UDP destination port numbers |
| 58-60 | 53, 123, 520 |
| 61-66 | Range other than the above divided into 6 sections (0-52, 54-122, 124-519, 521-1023, 1025-9999, 10000-65535) |

In the experiment, the traffic data classified by type was observed at every time slot of 10 second. The window necessary for the calculation of correlation coefficients has a width of 300 seconds (corresponding to 30 slots), and the threshold θ by which one can determine whether a given occurrence probability of correlation coefficient is anomalous or not, was set to θ=0.01. The experiment was performed for 5 months from Jan. 1, 2005 to May 31, 2005, and the number of packets observed during that period totaled 1132900380. Preparation of correlation coefficient histograms, and calculation of the occurrence probabilities of correlation coefficients, and anomalous scores were performed for each day, and preparation of correlation coefficient histograms of one day was achieved by using the data of the occurrence probabilities of correlation coefficients and of anomalous scores obtained on the previous day, namely, for example, the calculation of anomalous scores on January 2nd was achieved by using the correlation coefficient histograms prepared based on the data obtained on January 1st.

FIGS. 17 and 18 show the matrices of the occurrence probabilities of correlation coefficients exhibiting the highest and second highest anomalous scores per window observed during the experimental period, respectively. The anomalous scores were calculated with the sensitivity s being varied from 1 to 3 (s=1, 2, 3). FIGS. 17 and 18 show the matrices in question exhibiting the highest and second highest anomalous scores no matter what value s may take. The dot pattern shown in each of the figures is an image obtained by visualizing a matrix by depicting the occurrence probabilities, which are equal to or smaller than θ as white dots while the occurrence probabilities which are larger than θ as black dots.

FIGS. 17 and 18 show the images representing the data obtained at different days, but for both the cases, the involved incidents included scanning onto plural ports. Each straight line in the figure corresponds to the ordinal number signifying the port to which the attack was made, and indicates that the number of packets passing through the port increases, during the attack, to such a high level that the correlation coefficients of those packets with other packets are diverged from the normal so greatly as to produce a series of white dots. Conversely, if it is possible to efficiently identify, in a matrix of the occurrence probabilities of correlation coefficients, the occurrence probabilities with an anomalously low level plotted on a straight line, it will be possible not only to detect an anomaly, but also to recognize the feature values involved in the anomaly.

Thus, the detection standard for the anomaly severity AS was set such that only one straight line exists in parallel with each of the column and row of a matrix, and it was checked which anomaly such a matrix represents. In this experiment, 66 different types of traffics were observed, and for each type of traffic, its flow into/out of a network was tracked separately, and thus 132 different types of traffics were investigated. To tolerate a slight amount of errors, when s=1, the acceptable range of abnormal severity of the elements to be examined is set to 264 (132×2) to 280 (140×2). When s=2 or 3, the sensitivity s only emphasizes the elements arranged in rows. Thus, only the anomalous occurrence probabilities linearly arranged in horizontal rows are multiplied to the power of s, while the anomalous occurrence probabilities arranged in vertical columns are summed as they are. Namely, when s=2 or 3, the range of abnormal severity of the elements becomes $17556(132^2+132)-19740(140^2+140)$, or $2300100(132^2+132)-2744140(140^3+140)$.

FIG. 19 shows an exemplary result of anomaly detection. As is seen from the figure, it is possible to identify an observation quantity responsible for the outbreak of an anomaly by setting the detection range of anomaly severity as appropriate. Table 4 lists exemplary anomalous incidents detected in the experiment.

TABLE 4

Exemplary incidents detected in the experiment

| Sensitivity (s) | Incidents | Date of outbreak | Number of packets affected |
|---|---|---|---|
| 1 | Inflow of RST packets | 2005 May 24 07:59 | 4 |
| 2 | Inflow of UDP packets (src port 54-122) | 2005 May 15 00:53 | 1 |
| 3 | Inflow of ack packets (src port 81-109) | 2005 Feb. 01 15:57 | 2 |

For twelve hours before and after the outbreak of each incident, the packets were inspected minutely, but for the cases where s=1 or 3, the host was not identified that was responsible for the transmission of the affected packets. From this it was presumed that those affected packets appeared as a result of some anomaly or unauthorized access or as a backscatter accompanying such an anomaly. In this experiment, out of 1.1 billion packets recorded during the experimental period of 5 months, one to three packets were found to be affected, which demonstrates the effectiveness of the method proposed by the invention. FIG. 20 shows the traffic damp data of the host that was responsible for the transmission of the affected packets detected in a case where s=2. The packet underlined in the figure is the one that was identified to be involved in the anomaly. It is indicated in the experiment that it is also possible to extract a series of anomalous data by analyzing the communication of a host identified via the detection of affected packets.

FIG. 21 shows an exemplary erroneous detection of an anomaly in a case where s=1. In a case where s=1, even when the occurrence probabilities exhibiting anomalous values are scattered, the system will erroneously take the case anomalous when the total number of anomalous occurrence probabilities exceeds a threshold. In contrast, when the sensitivity s is set to a value larger than 1, anomalous occurrence probabilities arranged linearly are emphasized, and they account for the large portion of the overall anomaly. In particular, in a case where the sensitivity s is set to be equal to or larger than 2, and anomalous occurrence probabilities are arranged in two or more lines, their total number will exceed the total number of the elements constituting the matrix, and will cause a larger anomalous score than in a case where anomalous occurrence probabilities are scattered over the matrix. Probably, because of this, when s=1, a case was observed where an anomaly was erroneously detected, whereas, when s=2 or 3, such errors could be safely avoided. Thus, it can be said that the equation (3) including the anomaly severity is effective in the selective detection of an anomaly.

Verification Experiment 3

Next, an experiment was performed to see how the state similarity evaluating portion 106 shown in FIG. 1 works, using traffic data collected from a network actually in operation, and the result obtained from the experiment will be described below.

First, an experiment was performed to see how the first method for evaluating the state similarity of a network works, and the result will be described. The experimental environment consisted of the traffic data from a network in operation (verification experiment 1) collected by the first method for evaluating the state of the network in the detection of an anomaly described above.

Figure 14:
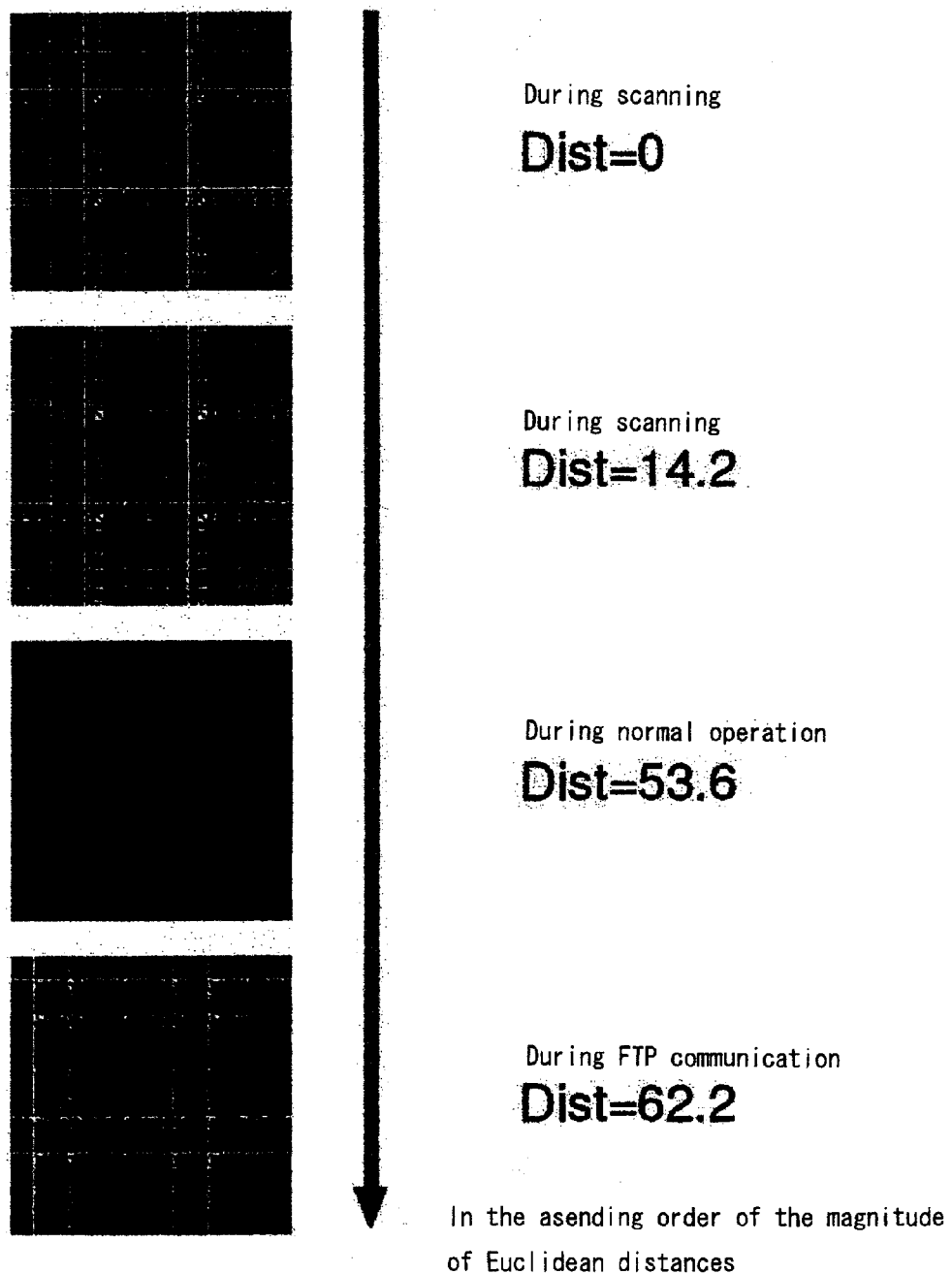
FIG. 14 illustrates a series of images (visualized images of probability distribution vector) arranged in the ascending order of the magnitude of Euclidean distances between an anomaly of interest and states to be compared.

The experiment performed to see how the method for evaluating the state similarity of a network works examines the method for evaluating the state similarity of a network by calculating a probability distribution vector obtained during the period when an anomaly was observed, comparing it with the probability distribution vector obtained during a period when a state to be compared occurs, and calculating the Euclidean distance between the two vectors. As a first example, calculation of a probability distribution vector during a period when scanning was made will be described. FIG. 14 illustrates a series of matrices of the occurrence probabilities of correlation coefficients arranged in the ascending order of the magnitude of Euclidean distance between an anomaly of interest and states to compared including, in the order of the figure, states when a similar scanning was made, normal state, and state observed during FTP communication. The image consisting of white dots against the black background is an image obtained by visualizing the probability distribution vectors of a 132×132 dimension, and will be referred to as a probability distribution vector image hereinafter. To help one to readily recognize how the individual occurrence probabilities of correlation coefficients exhibit an overall distribution pattern, the correlation coefficient between two feature values that have a value below a threshold are colored white, while those having a value equal to or larger than the threshold, i.e., normal correlation coefficients were colored black.

As seen from FIG. 14, the anomaly of interest is similar to the anomaly of comparison, as indicated by the Euclidean distance Dist=0 or Dist=14.2 (observed at a different time)

between the anomaly of interest and the anomaly of comparison consisting of scanning. This indicates that the anomaly of interest is similar to the anomalous states arising from the anomaly of comparison and confirmed at two different times. When the anomaly of interest is compared with a state free from anomalous incidents such as scanning, the Euclidean distance is Dist=53.6, or a value widely different from the distances observed in the former case, suggesting that the network state is also widely different between the two states used for comparison. When the anomaly of interest is compared with the state of a network engaged in FTP communication, which rarely occurs in the network, the Euclidean distance between the two was further extended. It was also found that the probability distribution image was widely different as well. As seen from above, if an anomaly of interest is compared with another anomaly, and the two are similar to each other, the Euclidean distance between the two will be small. On the contrary, if the two are dissimilar, the Euclidean distance between the two will be large. Thus, it is possible to evaluate the operation state of a network by picking up a state of interest and using its Euclidean distance from a reference state as an indicator for checking the operation state of a network.

Figure 15:
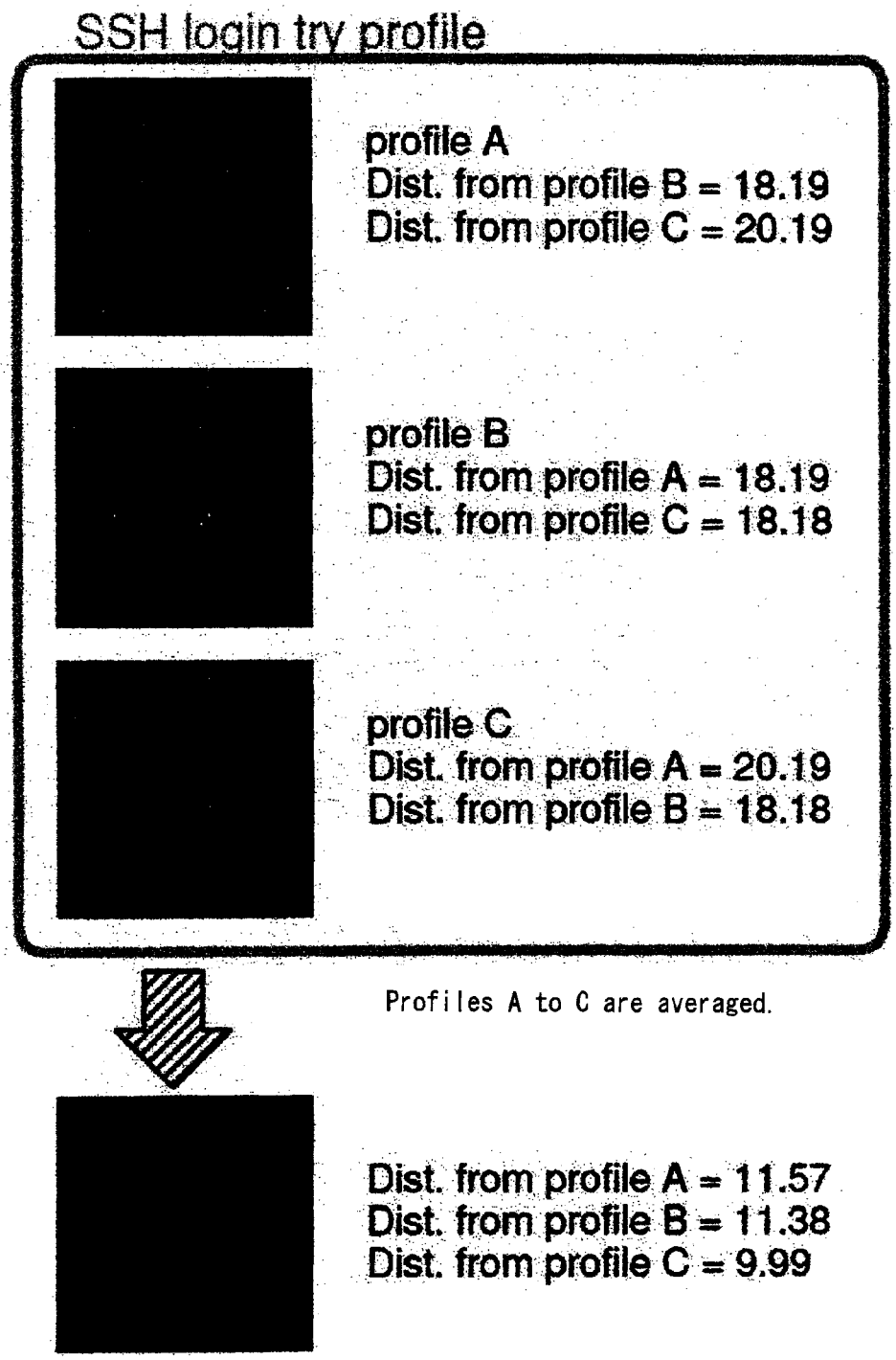
FIG. 15 illustrates an example where SSH login attempts were combined to provide a new profile.

Next, a group of similar incidents were collected, and their probability distribution images averaged to provide a profile common to the incidents. FIG. 15 illustrates an example where three SSH login attempts occurring at different times were picked up, an Euclidean distance was calculated between each pair of the incidents, and finally those Euclidean distances were averaged to give a profile representing the anomalous incident more precisely. Individual profiles including profile A to profile C include extra data in addition to the data directly involved in the SSH login attempts made at the respective times of the profile collection. It is possible to provide a new profile selectively emphasizing the feature characteristic of SSH login attempt by averaging those profiles, and extracting a portion common to the profiles. FIG. 15 shows, in the panel titled "SSH login try profile," the Euclidean distances observed between each pair of profiles A to C originally collected, and any one of those Euclidean distances is larger than the Euclidean distance of the respective profile from the newly provided profile. The reason why the Euclidean distance of any one of the initial profiles from the newly implemented profile is smaller than any Euclidean distance observed between two initial profiles may be ascribed to the fact that the new profile is obtained by removing extra and redundant data from the initial profiles, and thus represents the SSH login attempt more faithfully and precisely. Thus, it is possible, when there is an anomaly of interest, to collect plural profiles of the anomaly observed at different times, and average those profiles, so as to provide a profile which represents the anomaly more precisely. This experiment concerns with an SSH login attempt, but it was confirmed in other experiments that the same method can be applied to other attacks such as scanning, etc.

Figure 16:
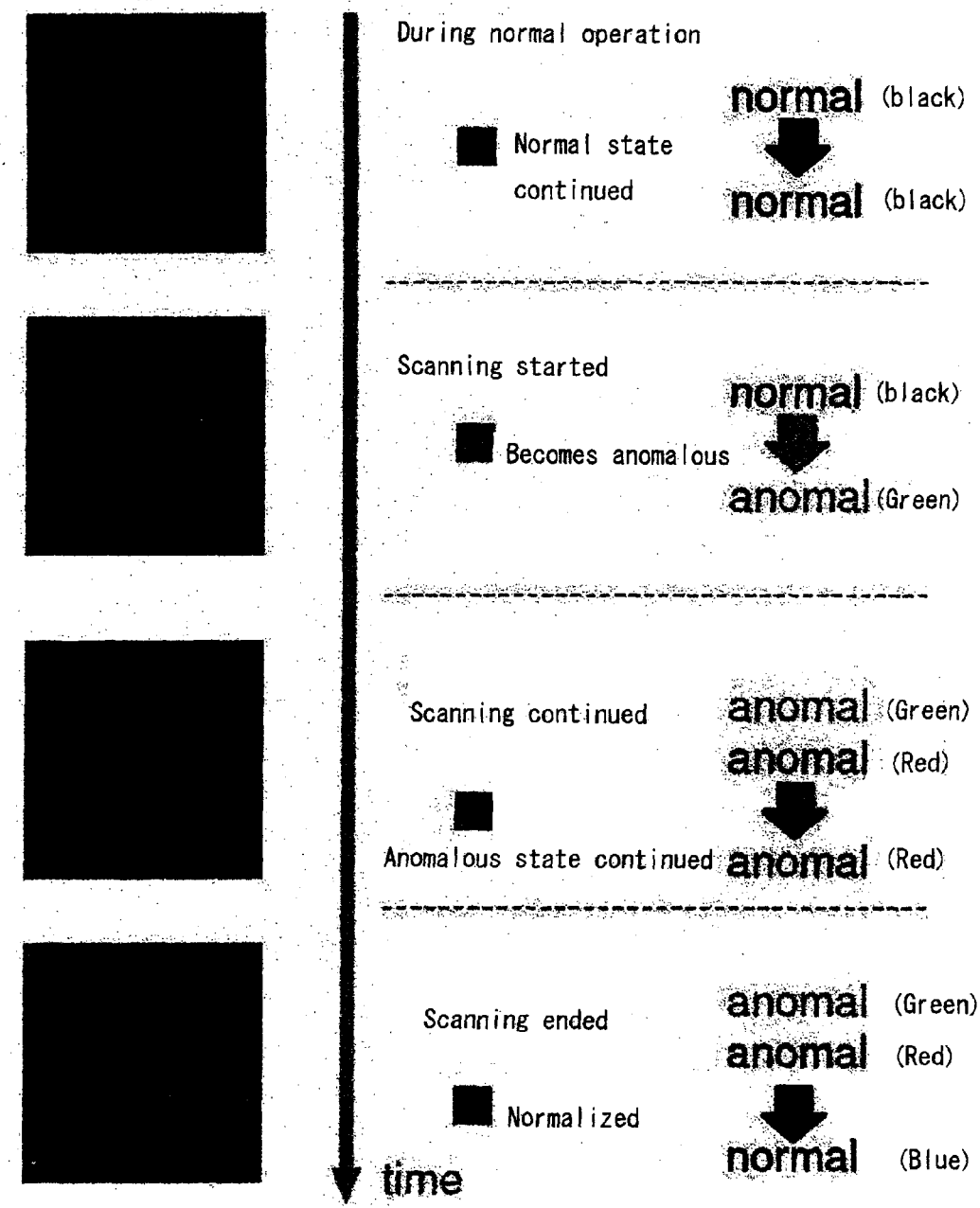
FIG. 16 presents an example where the change of state of a network is displayed in colors.

Next, FIG. 16 presents the visualization of an image representing the change of state of individual correlation coefficients. A correlation coefficient corresponds to a pixel, and a color is assigned to the pixel according to the correlation coefficient. Thus, the change of each pixel represents the change of the state of the feature values involved in the calculation of the correlation coefficient. The color and the change of state it represents are as shown in Table 5 below.

TABLE 5

Color and the change of state it represents

| Previous state | Current state | Change of state | Marking color |
|---|---|---|---|
| normal | normal | normal state continued | black |
| normal | anomalous | becomes anomalous | green |
| anomalous | anomalous | anomalous state continued | red |
| anomalous | normal | normalized | blue |

FIG. 16 presents the change of state of a network during the progress of an anomaly including the start of scanning, continuation of scanning and end of scanning. It is seen from the inspection of the figure that it is possible to readily grasp the state of a network by following the images representing the corresponding states of the network. Frequently at the start of scanning, the state of a network turns from normal to anomalous, which is represented by green elements. While the scanning is continued, the corresponding correlation coefficients are also in an anomalous state, and thus many red spots appear in the image. The change of state represented by a red color indicates the continuation of an anomalous state and is worthy of notice whenever detection of an anomaly is sought. At the end of scanning, many combinations of feature values for correlation coefficients will return from an anomalous state to a normal state, and thus blue spots will become notable. Thus, by marking the different changes of state of a network with the respective colors, the system will be able to effectively provide the network manager with information regarding the current state of the network. Furthermore it can be expected to identify, for an anomaly of interest, a cause responsible for the anomaly by collecting the changes represented by images of state around the time when the anomaly occurred, and comparing the images with those of an anomaly suspected to share the common cause.

It is revealed by the above state similarity evaluating experiments that the probability distribution vectors obtained from two similar incidents are apart from each other by a small Euclidean distance. Thus, it is possible to collect plural incidents, which are apart from each other by a small distance, to average the probability distribution vectors obtained from all the pairs of those incidents, and to prepare therewith a new profile representing the incident more precisely. Such a profile representing the incident more typically will be useful for the detection of another similar incident. Thus, it will be possible when an anomaly similar to the incident occurs, to readily detect the anomaly, and to identify a cause responsible for the anomaly by evaluating the similarity of the anomaly to the typical profile. Since the profiles can be overlapped, it will be possible even when plural anomalies occur at the same time to appear as a complex incident, to overlap the single profiles as appropriate to give a close match, and to identify which anomalies are involved in that complex incident. If for various anomalies, respective typical files that will give the smallest Euclidean distance are prepared and stored as a database, it will be possible to readily detect the outbreak of an anomaly in a network.

Verification Experiment 4

Next, a further experiment was done to check the second method for evaluating the state similarity of a network similar to the one describe above. The experimental environment consisted of the traffic data from a network in operation (verification experiment 2) collected by the second method for evaluating the state of the network in the detection of an anomaly described above. A case where a single UDP packet was detected when s=2 as shown in FIG. 19 served as a similar incident to be compared.

Table 6, and FIGS. 22 and 23 represent the dates at which similar incidents to be compared occurred, and matrices of the occurrence probabilities obtained at those dates, and network traffic damp data related with those incidents, respectively. FIG. 22 indicates that the group of matrices representing the occurrence probabilities are similar to each other and selected properly. In addition, all the incidents were caused by anomalous UDP packets like an incident, which occurred on May 15, 2005 and served as a reference, as shown in FIG. 23. There is a slight difference between the time shown in Table 6 and the observation time of packets, and this is because the window for calculating correlation coefficients is selected so that (10 sec width of observation slot)×(30 slots)=5 minutes.

From this experiment, it was revealed that it is possible to identify anomalous packets, even when the data to be analyzed involves an immense volume of data accumulated over several months, by properly evaluating the similarity of the packets to reference packets with respect to the distribution of the occurrence probabilities of correlation coefficients.

Industrial Applicability

With the spread of the internet, a LAN has been exposed to attacks including DoS/DDoS targeted to hosts as well as to attacks directed to network devices, and the manager of such a LAN is requested to promptly take a proper measure against such an attack. In view of this, the present invention provides a technique for identifying, when an anomaly occurs, a cause responsible for the anomaly, by using the number of packets counted divided by the type of traffic as a feature value, calculating correlation coefficients between each pair of two feature values, representing the occurrence probabilities of the correlation coefficients as a histogram, and defining the states of a network using the histograms with due attention paid to the identification of a cause responsible for the anomaly. The present invention further provides a technique whereby it is possible to express the occurrence probabilities of correlation coefficients between each pair of two feature values as a matrix with the two feature values arranged in columns and rows, and to assign a color to each of the occurrence probabilities constituting the matrix, so as to visualize the matrix, and to allow one to intuitively grasp the overall state of traffic by tracking the change of colors displayed in the picture. If the inventive technique is incorporated in a network management tool, it will be possible for the network manager to immediately recognize the overall state of a network at a given moment, and thus to improve the efficiency of network management support and detection of an anomaly in the network.

The invention claimed is:

1. A method for detecting an anomaly in a network comprising:

a feature value generating step for counting the number of packets per each time slot for each traffic type defined by classifying packets to k types (k is a natural number equal to or larger than 2) according to types including protocols and flags with respect to network traffic, and generating feature values, consisting of time sequence data for each time slot, classified by the traffic type (k types);

a correlation coefficient calculating step for calculating correlation coefficients between each pair of two feature values chosen from the feature values classified by k type via the feature value generating step for each time range pre-specified and generating the time sequence data of the correlation coefficients;

a histogram generating step for generating histograms representing the occurrence probabilities of individual correlation coefficients obtained via the correlation coefficient calculating step for each classes pre-specified as range of the correlation coefficients, by plotting the frequency of the correlation coefficients over individual classes and dividing the frequency of the correlation coefficients over individual classes with the total of the frequency; and an anomaly severity determining step for defining normal correlation coefficient histograms generated via the histogram generating step, determining the severity of an anomaly of an anomaly of the correlation coefficient obtained via the correlation coefficient calculating step using the normal correlation coefficient histograms, the method further comprising:

a state similarity evaluating step for expressing the correlation coefficients obtained via the correlation coefficient calculating step as matrices; converting the matrices consisting of correlation coefficients into matrices consisting of probability distribution vectors, defining plural probability distribution vectors representing a similar anomaly as a single profile, and evaluating an anomaly of the matrix by comparing the matrix with the profile;

a visualizing step for expressing the occurrence probabilities of correlation coefficients calculated by the state similarity evaluating step as the matrix and assigning colors to each element of the matrix according to the occurrence probabilities of the matrix for the visualization of the matrix.

2. The method as described in claim 1, the correlation coefficient calculating step comprising:

calculating the correlation coefficients for each pair of two feature values chosen from the feature values, which are consisting of time sequence data and classified by k type via the feature value generating step, within a window defined as a time slot including a width W; and sliding the window for each interval equal to S time slots, and calculating the correlation coefficients for each slide, wherein, using the above step, the correlation coefficients for all the pairs of two feature values chosen from the feature values classified by k types are calculated for each window, the time sequence data of the correlation coefficients are generated for all the pairs of two feature values chosen from the feature values classified by k types, and the above-mentioned correlation coefficient r ($-1 \leq r \leq 1$) between two elements x and y is calculated by using the equation (1), where $x^-$ and $y^-$ represent the averages of the elements x and y $$x=(x_1, x_2, \ldots, x_n)$$

$$y=(y_1, y_2, \ldots, y_n)$$

$$r = \frac{\sum_{i=1}^{n}(x_1-\bar{x})(y_i-\bar{y})}{\sqrt{\sum_{i=1}^{n}(x_i-\bar{x})^2 \sum_{i=1}^{n}(y_i-\bar{y})^2}} = \frac{C(x,y)}{\sigma(x)\sigma(y)}. \quad (1)$$

3. The method as described in claim 2, the correlation coefficient calculating step further comprising:
  in a case where a combination of two feature values for which calculation of the correlation coefficients is impossible exists, assigning an exempt value as the correlation coefficient for the combination.

4. The method as described in claim 1, the histogram generating step comprising:
  defining the range of the correlation coefficients consisting of time sequence data as a class width;
  plotting the distribution of the correlation coefficients over the full range of the correlation coefficient divided by the classes and representing the frequency of the correlation coefficients over individual classes; and
  generating histograms representing the occurrence probabilities of individual correlation coefficients for each classes, by dividing the frequency of the correlation coefficients over individual classes with the total of the frequency,
  wherein, using the above step, correlation coefficient histograms are generated for all the pairs of two feature values chosen from the feature values classified by k types.

5. The method as described in claim 1, the anomaly severity determining step comprising:
  defining normal correlation coefficient histograms generated via the histogram generating step as normal model representing the normal operation state of the network;
  collating the correlation coefficient obtained via the correlation coefficient calculating step with the occurrence probability according to the corresponding class represented by the normal correlation coefficient histogram; and
  quantitatively determining the severity of an anomaly of the correlation coefficient obtained via the correlation coefficient calculating step by comparing the occurrence probability with a pre-specified standard value and examining how these values are different.

6. The method as described in claim 1, the anomaly severity determining step further comprising:
  defining normal correlation coefficient histograms generated via the histogram generating step as normal model representing the normal operation state of the network;
  expressing the correlation coefficients obtained via the correlation coefficient calculating step as matrices;
  converting the matrices consisting of correlation coefficients into matrices consisting of the occurrence probabilities of correlation coefficients using the occurrence probabilities for each classes represented by the normal correlation coefficient histograms;
  counting, for the matrix consisting of the occurrence probabilities of correlation coefficients, the total number of elements whose values are equal to or less than a pre-specified threshold value; and
  quantitatively determining the severity of an anomaly of the matrix based on the total number.

7. The method as described in claim 1, the state similarity evaluating step comprising:
  defining normal correlation coefficient histograms generated via the histogram generating step as normal model representing the normal operation state of the network;
  expressing the correlation coefficients obtained via the correlation coefficient calculating step as matrices;
  converting the matrices consisting of correlation coefficients into matrices consisting of probability distribution vectors using the occurrence probabilities for each classes represented by the normal correlation coefficient histograms;
  defining plural probability distribution vectors representing a similar anomaly as a single profile by calculating the average of them or clustering them; and
  evaluating the similarity of an anomaly of the matrix by comparing the matrix with the profile.

8. The method as described in claim 7, the state similarity evaluating step further comprising:
  calculating an Euclidean distance between the probability distribution vector used for the definition of the profile and the probability distribution vector of the arbitrarily matrix; and
  using the Euclidean distance as an indicator representing the similarity of an anomaly of the matrix.

9. The method as described in claim 1, the state similarity evaluating step further comprising:
  defining normal correlation coefficient histograms generated via the histogram generating step as normal model representing the normal operation state of the network;
  expressing the correlation coefficients obtained via the correlation coefficient calculating step as matrices;
  converting the matrices consisting of correlation coefficients into matrices consisting of the occurrence probabilities of correlation coefficients using the occurrence probabilities for each classes represented by the normal correlation coefficient histograms;
  counting, when comparing matrices A and B both consisting of the occurrence probabilities of correlation coefficients, the total number of elements whose values are equal to or less than a pre-specified threshold value for both the matrices; and
  quantitatively determining the similarity of matrices A and B based on the total number.

10. The method as described in claim 1, the visualization step comprising:
  visualizing the change of the operation state of a network by taking each combination of two feature values as representative of a pixel using the pixel value from the probability distribution vectors (N×N dimensional vectors) calculated from the correlation coefficients via the state similarity evaluation step; and
  visualizing the change of the operation state of a network over time by tracking the change of colors displayed in the picture by assigning a color to each of the occurrence probabilities constituting the matrix.

11. A system for detecting an anomaly in a network comprising:
  a feature value generating portion for counting the number of packets per each time slot for each traffic type defined by classifying packets to k types (k is a natural number equal to or larger than 2) according to types including protocols and flags with respect to network traffic, and generating feature values, consisting of time sequence data for each time slot, classified by the traffic type (k types);

a correlation coefficient calculating portion for calculating correlation coefficients between each pair of two feature values chosen from the feature values classified by k type via the feature value generating portion for each time range pre-specified and generating the time sequence data of the correlation coefficients;

a histogram generating portion for generating histograms representing the occurrence probabilities of individual correlation coefficients obtained via the correlation coefficient calculating portion for each classes pre-specified as range of the correlation coefficients, by plotting the frequency of the correlation coefficients over individual classes and dividing the frequency of the correlation coefficients over individual classes with the total of the frequency; and an anomaly severity determining portion for defining normal correlation coefficient histograms generated via the histogram generating portion, determining the severity of an anomaly of the correlation coefficient obtained via the correlation coefficient calculating portion using the normal correlation coefficient histograms, the system further comprising:

a state similarity evaluating portion for expressing the correlation coefficients obtained via the correlation coefficient calculating portion as matrices; converting the matrices consisting of correlation coefficients into matrices consisting of probability distribution vectors, defining plural probability distribution vectors representing a similar anomaly as a single profile, and evaluating an anomaly of the matrix by comparing the matrix with the profile;

and a visualization portion for expressing the occurrence probabilities of correlation coefficients calculated by the state similarity evaluating portion as the matrix and assigning colors to each element of the matrix according to the occurrence probability value of the matrix for the visualization of the matrix.

12. The system as described in claim 11, the correlation coefficient calculating portion comprising:

calculating the correlation coefficients for each pair of two feature values chosen from the feature values, which are consisting of time sequence data and classified by k type via the feature value generating portion, within a window defined as a time slot including a width W; and sliding the window for each interval equal to S time slots and calculating the correlation coefficients for each shift slide, wherein using the said means, the correlation coefficients for all the pairs of two feature values chosen from the feature values classified by k types are calculated for each window, the time sequence data of the correlation coefficients are generated for all the pairs of two feature values chosen from the feature values classified by k types, and the above-mentioned correlation coefficient r ($-1 \leq r \leq 1$) between two elements x and y is calculated by using the equation (1), where $x^-$ and $y^-$ represent the averages of the elements x and y $$x = (x_1, x_2, \ldots, x_n)$$

$$y = (y_1, y_2, \ldots, y_n)$$

$$r = \frac{\sum_{i=1}^{n}(x_i - \bar{x})(y_i - \bar{y})}{\sqrt{\sum_{i=1}^{n}(x_i - \bar{x})^2 \sum_{i=1}^{n}(y_i - \bar{y})^2}} = \frac{C(x, y)}{\sigma(x)\sigma(y)}. \quad (1)$$

13. The system as described in claim 12, the correlation coefficient calculating portion, further comprising:

in a case where a combination of two feature values for which calculation of the correlation coefficients is impossible exists, assigning an exempt value as the correlation coefficient for the combination.

14. The system as described in claim 11, the histogram generating portion comprising:

defining the range of the correlation coefficients consisting of time sequence data as a class width;

plotting the distribution of the correlation coefficients over the full range of the correlation coefficient divided by the classes and representing the frequency of the correlation coefficients over individual classes; and generating histograms representing the occurrence probabilities of individual correlation coefficients for each classes, by diving the frequency of the correlation coefficients over individual classes with the total of the frequency, wherein, using the said means, correlation coefficient histograms are generated for all the pairs of two feature values chosen from the feature values classified by k types.

15. The system as described in claim 11, the anomaly severity determining portion comprising:

defining normal correlation coefficient histograms generated via the histogram generating portion as normal model representing the normal operation state of the network;

collating the correlation coefficient obtained via the correlation coefficient calculating portion with the occurrence probability according to the corresponding class represented by the normal correlation coefficient histogram; and quantitatively determining the severity of an anomaly of the correlation coefficient obtained via the correlation coefficient calculating portion by comparing the occurrence probability with a pre-specified standard value and examining how these values are different.

16. The system as described in claim 11, the anomaly severity determining portion further comprising:

defining normal correlation coefficient histograms generated via the histogram generating portion as normal model representing the normal operation state of the network;

expressing the correlation coefficients obtained via the correlation coefficient calculating portion as matrices;

converting the matrices consisting of correlation coefficients into matrices consisting of the occurrence probabilities of correlation coefficients using the occurrence probabilities for each classes represented by the normal correlation coefficient histograms;

counting, for the matrix consisting of the occurrence probabilities of correlation coefficients, the total number of elements whose values are equal to or less than a pre-specified threshold value; and quantitatively determining the severity of an anomaly of the matrix based on the total number.

17. The system as described in claim 11, the state similarity evaluating portion comprising:
- defining normal correlation coefficient histograms generated via the histogram generating portion as normal model representing the normal operation state of the network;
- expressing the correlation coefficients obtained via the correlation coefficient calculating step as matrices;
- converting the matrices consisting of correlation coefficients into matrices consisting of probability distribution vectors, using the occurrence probabilities for each classes represented by the normal correlation coefficient histograms;
- defining plural probability distribution vectors representing a similar anomaly as a single profile by calculating the average of them or clustering them; and
- evaluating the similarity of an anomaly of the matrix by comparing the matrix with the profile.

18. The system as described in claim 17, the state similarity evaluating portion further comprising:
- calculating an Euclidean distance between the probability distribution vector used for the definition of the profile and the probability distribution vector of the arbitrarily matrix; and
- using the Euclidean distance as an indicator representing the similarity an anomaly of the matrix.

19. The method as described in claim 11, the state similarity evaluating portion further comprising:
- defining normal correlation coefficient histograms generated via the histogram generating portion as normal model representing the normal operation state of the network;
- expressing the correlation coefficients obtained via the correlation coefficient calculating step as matrices;
- converting the matrices consisting of correlation coefficients into matrices consisting of the occurrence probabilities of correlation coefficients using the occurrence probabilities for each classes represented by the normal correlation coefficient histograms;
- counting, when comparing matrices A and B both consisting of the occurrence probabilities of correlation coefficients, the total number of elements whose values are equal to or less than a pre-specified threshold value for both the matrices; and
- quantitatively determining the similarity of matrices A and B based on the total number.

20. The system as described in claim 11, the visualization portion comprising:
- visualizing the change of the operation state of a network by taking each combination of two feature values as representative of a pixel using the pixel value from the probability distribution vectors (N×N dimensional vectors) calculated from the correlation coefficients by the state similarity evaluating portion; and
- visualizing the change of the operation state of a network over time by tracking the change of colors displayed in the picture by assigning a color to each of the occurrence probabilities constituting the matrix.

* * * * *